United States Patent
Moreillon et al.

(10) Patent No.: US 10,843,727 B2
(45) Date of Patent: Nov. 24, 2020

(54) STEERING APPARATUS

(71) Applicant: JTEKT CORPORATION, Osaka-shi, Osaka (JP)

(72) Inventors: Maxime Moreillon, Nara (JP); Tsutomu Tamura, Nara (JP); Robert Fuchs, Nara (JP); Naoki Shoji, Uda (JP)

(73) Assignee: JTEKT CORPORATION, Osaka (JP)

( * ) Notice: Subject to any disclaimer, the term of this patent is extended or adjusted under 35 U.S.C. 154(b) by 258 days.

(21) Appl. No.: 16/026,231

(22) Filed: Jul. 3, 2018

(65) Prior Publication Data
US 2019/0009816 A1    Jan. 10, 2019

(30) Foreign Application Priority Data

Jul. 7, 2017 (JP) .................. 2017-134070
May 11, 2018 (JP) .................. 2018-092490

(51) Int. Cl.
*B62D 6/10* (2006.01)
*B62D 1/28* (2006.01)
(Continued)

(52) U.S. Cl.
CPC ............... *B62D 6/10* (2013.01); *B62D 1/286* (2013.01); *B62D 6/08* (2013.01); *G01L 5/221* (2013.01);
(Continued)

(58) Field of Classification Search
CPC . B62D 6/10; B62D 1/286; B62D 6/08; B62D 5/005; B62D 5/0421; B62D 5/0463; B62D 5/04; B62D 6/00; G01L 5/221
See application file for complete search history.

(56) References Cited

U.S. PATENT DOCUMENTS

2006/0086560 A1    4/2006 Furusho et al.
2012/0004808 A1    1/2012 Kuramori
(Continued)

FOREIGN PATENT DOCUMENTS

EP    1304275 A1    4/2003
EP    2771226 A1    9/2014
(Continued)

OTHER PUBLICATIONS

Dec. 12, 2018 Extended European Search Report issued in European Patent Application No. 18181919.4.

*Primary Examiner* — Marthe Y Marc-Coleman
(74) *Attorney, Agent, or Firm* — Oliff PLC

(57) ABSTRACT

A steering apparatus includes: a first shaft which is coupled to a steering wheel; a torsion bar; a second shaft which is coupled to the first shaft through the torsion bar; a torsion bar torque detection unit detecting a torsion bar torque which is applied to the torsion bar; and an electronic control unit configured to estimate a driver torque which is applied to the steering wheel by a driver. The electronic control unit is configured to: i) compute a steering wheel rotation angle which is a rotation angle of the steering wheel; and ii) compute a value including an added value, as the driver torque, the added value being a value resulting from adding the torsion bar torque, a steering wheel inertia torque compensation value, and a gravity torque compensation value.

13 Claims, 16 Drawing Sheets

(51) Int. Cl.
- *B62D 6/08* (2006.01)
- *G01L 5/22* (2006.01)
- *B62D 5/04* (2006.01)
- *B62D 6/00* (2006.01)
- *B62D 5/00* (2006.01)

(52) U.S. Cl.
CPC ............ *B62D 5/005* (2013.01); *B62D 5/0421* (2013.01); *B62D 5/0463* (2013.01)

(56) References Cited

U.S. PATENT DOCUMENTS

| | | | |
|---|---|---|---|
| 2014/0277944 A1* | 9/2014 | Bean | B62D 6/002 |
| | | | 701/41 |
| 2014/0303848 A1* | 10/2014 | Bean | B62D 5/0463 |
| | | | 701/41 |
| 2015/0191200 A1* | 7/2015 | Tsubaki | B62D 6/002 |
| | | | 701/42 |
| 2016/0280267 A1* | 9/2016 | Lavoie | B62D 13/06 |
| 2017/0183032 A1* | 6/2017 | Wilhelm | G01L 3/10 |

FOREIGN PATENT DOCUMENTS

| | | |
|---|---|---|
| EP | 3184404 A2 | 6/2017 |
| JP | 2006-151360 A | 6/2006 |
| WO | 2013/060898 A1 | 5/2013 |

\* cited by examiner

STEERING APPARATUS

INCORPORATION BY REFERENCE

The disclosure of Japanese Patent Application No. 2018-092490 filed on May 11, 2018 including the specification, drawings and abstract is incorporated herein by reference in its entirety.

BACKGROUND

1. Technical Field

The disclosure relates to a steering apparatus capable of estimating a driver torque that is applied to a steering wheel by a driver.

2. Description of Related Art

Japanese Patent Application Publication No. 2006-151360 discloses a steering system including a steering torque sensor that detects a torsion of a torsion bar, a steering angle sensor that detects a rotation angle (steering angle) of a column shaft, and a torque generation unit that computes a steering-wheel-side torque (driver torque) based on a steering torque detection value obtained by the steering torque sensor and a steering angle detection value obtained by the steering angle sensor.

SUMMARY

The disclosure provides a steering apparatus capable of estimating a driver torque at a high accuracy.

An aspect of the disclosure relates to a steering apparatus including: a first shaft which is coupled to a steering wheel, the steering wheel being a steering wheel by which a vehicle is steered; a torsion bar; a second shaft which is coupled to the first shaft through the torsion bar; a torsion bar torque detection unit detecting a torsion bar torque which is applied to the torsion bar; and an electronic control unit configured to estimate a driver torque which is applied to the steering wheel by a driver, wherein the electronic control unit is configured to: i) compute a steering wheel rotation angle which is a rotation angle of the steering wheel; and ii) compute a value including an added value, as the driver torque, the added value being a value resulting from adding the torsion bar torque, a steering wheel inertia torque compensation value, and a gravity torque compensation value, the steering wheel inertia torque compensation value being a product of a second-order differential value of the steering wheel rotation angle and an inertia moment of the steering wheel, the gravity torque compensation value being a compensation value for a gravity torque to be applied to the first shaft by gravity that acts on a gravity center of the steering wheel.

With the steering apparatus according to the above aspect, the driver torque is computed in consideration of the gravity torque to be applied to the first shaft by the gravity that acts on the gravity center of the steering wheel, in addition to the torsion bar torque and the steering wheel inertia torque, and therefore, the driver torque can be estimated at a high accuracy.

In the above aspect, the steering apparatus may further include a rotational angle detection unit which directly or indirectly detects a rotation angle of the second shaft. The electronic control unit may be configured to compute the steering wheel rotation angle using the rotation angle of the second shaft and the torsion bar torque.

In the above aspect, the electronic control unit may be configured to compute the driver torque by adding a viscous friction torque compensation value to the added value, the viscous friction torque compensation value being a compensation value for a viscous friction torque that acts on the first shaft and the steering wheel; and the viscous friction torque compensation value may be a product of a first-order differential value of the steering wheel rotation angle and a predetermined viscous friction torque coefficient.

With the steering apparatus according to the above aspect, the driver torque is computed also in consideration of the viscous friction torque that acts on the first shaft and the steering wheel, and therefore, the driver torque can be estimated at a higher accuracy.

In the above aspect, the electronic control unit may be configured to compute the driver torque by adding a coulomb friction torque compensation value to the added value, the coulomb friction torque compensation value being a compensation value for a coulomb friction torque that acts on the first shaft and the steering wheel; and the coulomb friction torque compensation value may be a product of a hyperbolic tangent and a predetermined coulomb friction torque coefficient, the hyperbolic tangent being a hyperbolic tangent of a product of a predetermined coulomb friction torque gradient and a first-order differential value of the steering wheel rotation angle.

With the steering apparatus according to the above aspect, the driver torque is computed also in consideration of the coulomb friction torque that acts on the first shaft and the steering wheel, and therefore, the driver torque can be estimated at a higher accuracy.

In the above aspect, the gravity torque compensation value may be a product of a distance between a gravity center position of the steering wheel and a rotation center position, a mass of the steering wheel, a sine value of the steering wheel rotation angle, and a cosine value of a steering wheel tilt angle. The steering wheel tilt angle may be an angle between a vertical line and a rotation plane of the steering wheel in a state where the steering wheel is mounted on the vehicle, the vertical line being a vertical line that passes through the rotation center position of the steering wheel. The steering wheel rotation angle may be an angle corresponding to a rotation amount from a neutral position and a rotation direction, the neutral position being a steering wheel position at which an orientation of the vehicle is a straight direction.

In the above aspect, the electronic control unit may be configured to: i) compute an acceleration in a vehicle-lateral direction that acts on the gravity center of the steering wheel; and ii) compute the driver torque by adding a lateral acceleration torque compensation value to the added value, the lateral acceleration torque compensation value being a compensation value for a lateral acceleration torque which is applied to the first shaft by the acceleration in the vehicle-lateral direction that acts on the gravity center of the steering wheel.

With the steering apparatus according to the above aspect, the driver torque is computed also in consideration of the lateral acceleration torque to be applied to the first shaft by the acceleration in the vehicle-lateral direction that acts on the gravity center of the steering wheel, and therefore, the driver torque can be estimated at a higher accuracy.

In the above aspect, the lateral acceleration torque compensation value may be a product of a distance between a gravity center position of the steering wheel and a rotation center position, a mass of the steering wheel, the acceleration in the vehicle-lateral direction that acts on the gravity center of the steering wheel, and a cosine value of the steering wheel rotation angle.

In the above aspect, the electronic control unit may be configured to determine whether a hands-on state is formed, based on the driver torque; and the hands-on state is a state where the driver is holding the steering wheel.

In the above aspect, the steering apparatus may further include an electric motor configured to assist steering, wherein the electronic control unit is configured to: i) generate a manual steering command value using the driver torque; ii) compute a summed angle command value by adding the manual steering command value to an automatic steering command value; and iii) control the electric motor based on the summed angle command value.

With the steering apparatus according to the above aspect, the summed angle command value is computed by adding the manual steering command value to the automatic steering command value, and the electric motor is controlled based on the summed angle command value. Thereby it is possible to realize a cooperative control that allows a manual steering while performing mainly an automatic steering control as the steering control, without the switching between the manual steering control and the automatic steering control. Accordingly, it is possible to seamlessly perform the transition between the manual steering control and the automatic steering control, and therefore, it is possible to reduce an uncomfortable feeling of the driver.

With the steering apparatus according to the above aspect, it is possible to restrain the manual steering command value from being set based on disturbance other than the driver torque, when there is a high possibility that the driver is not operating the steering wheel.

In the above aspect, the electronic control unit may be configured to: i) set an assist torque command value based on the driver torque; and ii) generate the manual steering command value using the driver torque and the assist torque command value.

In the above aspect, the steering apparatus may further include an electric motor configured to assist steering. The electronic control unit may be configured to: i) generate a manual steering command value using the torsion bar torque, only when an absolute value of the driver torque is equal to or larger than a predetermined value; ii) compute a summed angle command value by adding the manual steering command value to an automatic steering command value; and iii) control the electric motor based on the summed angle command value.

With the steering apparatus according to the above aspect, it is possible to realize a cooperative control that allows the manual steering while performing mainly the automatic steering control as the steering control, without the switching between the manual steering control and the automatic steering control. Accordingly, it is possible to seamlessly perform the transition between the manual steering control and the automatic steering control, and therefore, it is possible to reduce the uncomfortable feeling of the driver. Further, with this configuration, it is possible to restrain the manual steering command value from being set based on the disturbance other than the driver torque, when the driver is not operating the steering wheel.

In the above aspect, the electronic control unit may be configured to: i) set an assist torque command value based on the torsion bar torque; and ii) generate the manual steering command value using the torsion bar torque and the assist torque command value, only when the absolute value of the driver torque is equal to or larger than the predetermined value.

In the above aspect, the steering apparatus may further include an electric motor configured to assist steering. The electronic control unit may be configured to: i) generate a manual steering command value using the torsion bar torque, only when it is determined that the hands-on state is formed; ii) compute a summed angle command value by adding the manual steering command value to an automatic steering command value; and iii) control the electric motor based on the summed angle command value.

With the steering apparatus according to the above aspect, it is possible to realize a cooperative control that allows the manual steering while performing mainly the automatic steering control as the steering control, without the switching between the manual steering control and the automatic steering control. Accordingly, it is possible to seamlessly perform the transition between the manual steering control and the automatic steering control, and therefore, it is possible to reduce the uncomfortable feeling of the driver. Further, with this configuration, it is possible to restrain the manual steering command value from being set based on the disturbance other than the driver torque, when the driver is not operating the steering wheel.

In the above aspect, the electronic control unit may be configured to: i) set an assist torque command value based on the torsion bar torque; and ii) generate the manual steering command value using the torsion bar torque and the assist torque command value, only when it is determined that the hands-on state is formed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
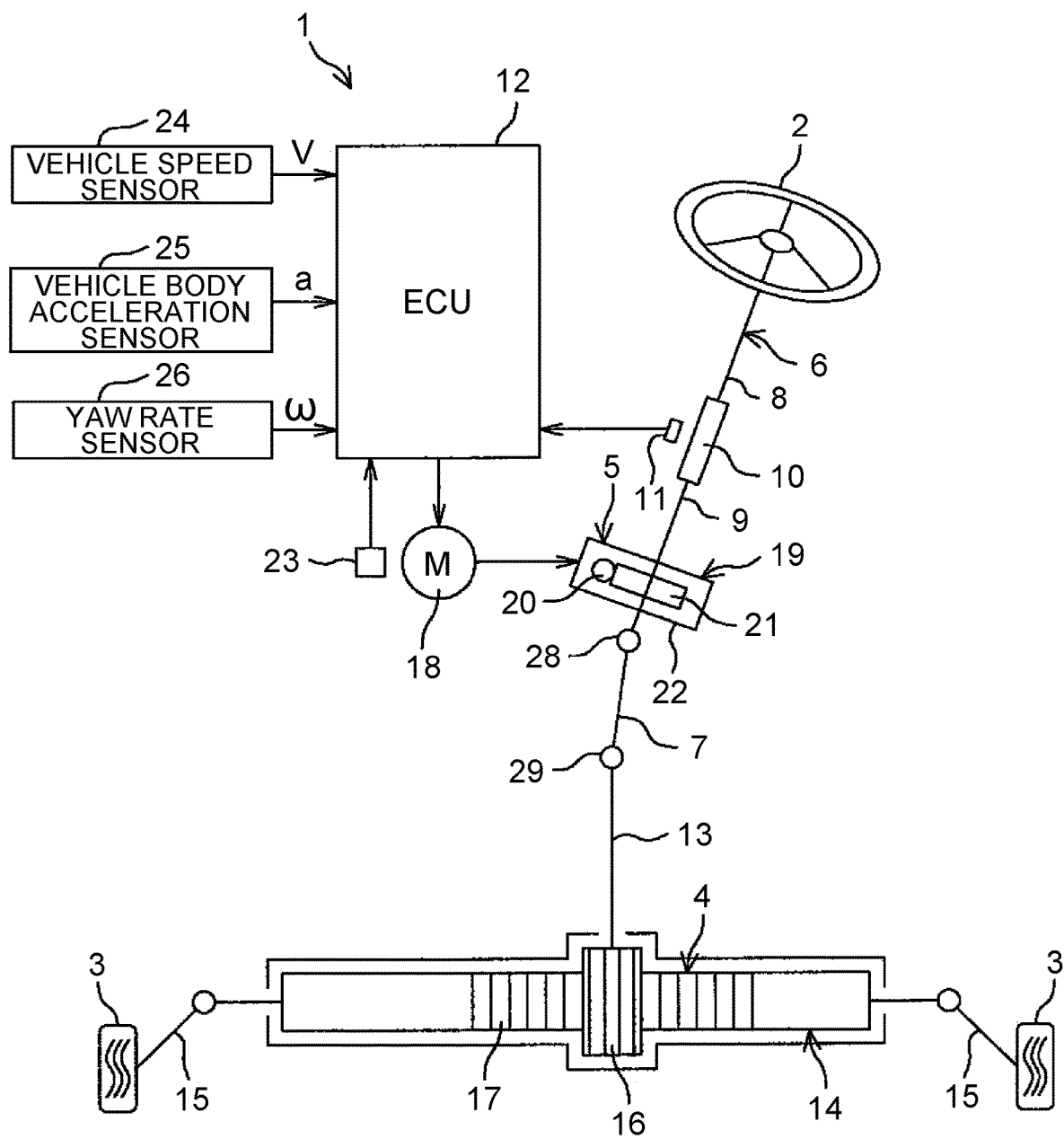
FIG. 1 is a schematic view showing a brief configuration of an electric power steering apparatus to which a steering apparatus according to a first embodiment of the disclosure is applied.

FIG. 1 is a schematic view showing a brief configuration of an electric power steering apparatus to which a steering apparatus according to a first embodiment of the disclosure is applied. The electric power steering apparatus (vehicle steering apparatus) 1 is a column assist type electric power steering apparatus (hereinafter, referred to as "column type EPS") in which an electric motor and a reduction drive are disposed in a column part.

The column type EPS 1 includes a steering wheel 2 as a steering member for operating the orientation of a vehicle, a turning mechanism 4 that turns turned wheels 3 in response to the rotation of the steering wheel 2, and a steering assist mechanism 5 that assists the steering by a driver. The steering wheel 2 and the turning mechanism 4 are mechanically coupled through a steering shaft 6, a first universal joint 28, an intermediate shaft 7, and a second universal joint 29.

The steering shaft 6 includes a first shaft 8 that is coupled to the steering wheel 2, and a second shaft 9 that is coupled to the intermediate shaft 7 through the first universal joint 28. The first shaft 8 and the second shaft 9 are coupled through a torsion bar 10, so as to rotate relatively. A torque sensor 11 is provided on the periphery of the steering shaft 6. The torque sensor 11 detects a torsion bar torque $T_{tb}$ applied to the torsion bar 10, based on the relative rotation displacement of the first shaft 8 and the second shaft 9. The torsion bar torque $T_{tb}$ detected by the torque sensor 11 is input to an electronic control unit (ECU) 12.

The turning mechanism 4 is a rack-and-pinion mechanism including a pinion shaft 13 and a rack shaft 14 as a turning shaft. The turned wheels 3 are coupled to the ends of the rack shaft 14 through tie rods 15 and steering knuckle arms (not illustrated). The pinion shaft 13 is coupled to the intermediate shaft 7 through the second universal joint 29. A pinion 16 is coupled to a distal end of the pinion shaft 13.

The rack shaft 14 extends linearly along a right-left direction of the vehicle. A rack 17 to engage with the pinion 16 is formed at an intermediate portion of the rack shaft 14 in an axial direction of the rack shaft 14. By the pinion 16 and the rack 17, the rotation of the pinion shaft 13 is transformed into the axial movement of the rack shaft 14. The turned wheels 3 can be turned by the movement of the rack shaft 14 in the axial direction.

When the steering wheel 2 is steered (rotated), the rotation is transmitted to the pinion shaft 13 through the steering shaft 6 and the intermediate shaft 7. Then, the rotation of the pinion shaft 13 is transformed into the axial movement of the rack shaft 14, by the pinion 16 and the rack 17. Thereby, the turned wheels 3 are turned. The steering assist mechanism 5 includes an electric motor 18 for generating a steering assist force and a reduction drive 19 for amplifying an output torque of the electric motor 18 and transmitting the torque to the turning mechanism 4. In the embodiment, the electric motor 18 is a three-phase brushless motor. The reduction drive 19 is a worm gear mechanism including a worm gear 20 and a worm wheel 21 that engages with the worm gear 20. The reduction drive 19 is contained in a gear housing 22. Hereinafter, a reduction ratio (gear ratio) of the reduction drive 19 is sometimes represented by $r_{wg}$. The reduction ratio $r_{wg}$ is defined as a ratio $\omega_{wg}/\omega_{ww}$ of an angular velocity $\omega_{wg}$ of the worm gear 20 to an angular velocity $\omega_{ww}$ of the worm wheel 21.

The worm gear 20 is driven to rotate by the electric motor 18. The worm wheel 21 is coupled to the second shaft 9 so as to rotate integrally with the second shaft 9. The worm wheel 21 is driven to rotate by the worm gear 20. The electric motor 18 is driven depending on the state of the steering by the driver, and the worm gear 20 is driven to rotate by the electric motor 18. Thereby, the worm wheel 21 is driven to rotate, and a motor torque is given to the steering shaft 6, so that the steering shaft 6 rotates. Then, the rotation of the steering shaft 6 is transmitted to the pinion shaft 13 through the intermediate shaft 7. The rotation of the pinion shaft 13 is transformed into the axial movement of the rack shaft 14. Thereby, the turned wheels 3 are turned. That is, since the worm gear 20 is driven to rotate by the electric motor 18, the steering assist by the electric motor 18 can be performed.

The rotation angle of a rotor of the electric motor 18 (hereinafter, referred to as "rotor rotation angle") is detected by a rotation angle sensor 23 such as a resolver. A vehicle speed V is detected by a vehicle speed sensor 24. A vehicle body acceleration (vehicle acceleration) a is detected by a vehicle body acceleration sensor 25. A vehicle body rotation angular velocity (vehicle rotation angular velocity) co is detected by a yaw rate sensor 26. The output signal of the rotation angle sensor 23, the vehicle speed V detected by the vehicle speed sensor 24, the vehicle body acceleration a detected by the vehicle body acceleration sensor 25, and the vehicle body rotation angle co detected by the yaw rate sensor 26 are input to the ECU 12. The electric motor 18 is controlled by the ECU 12.

Figure 2:
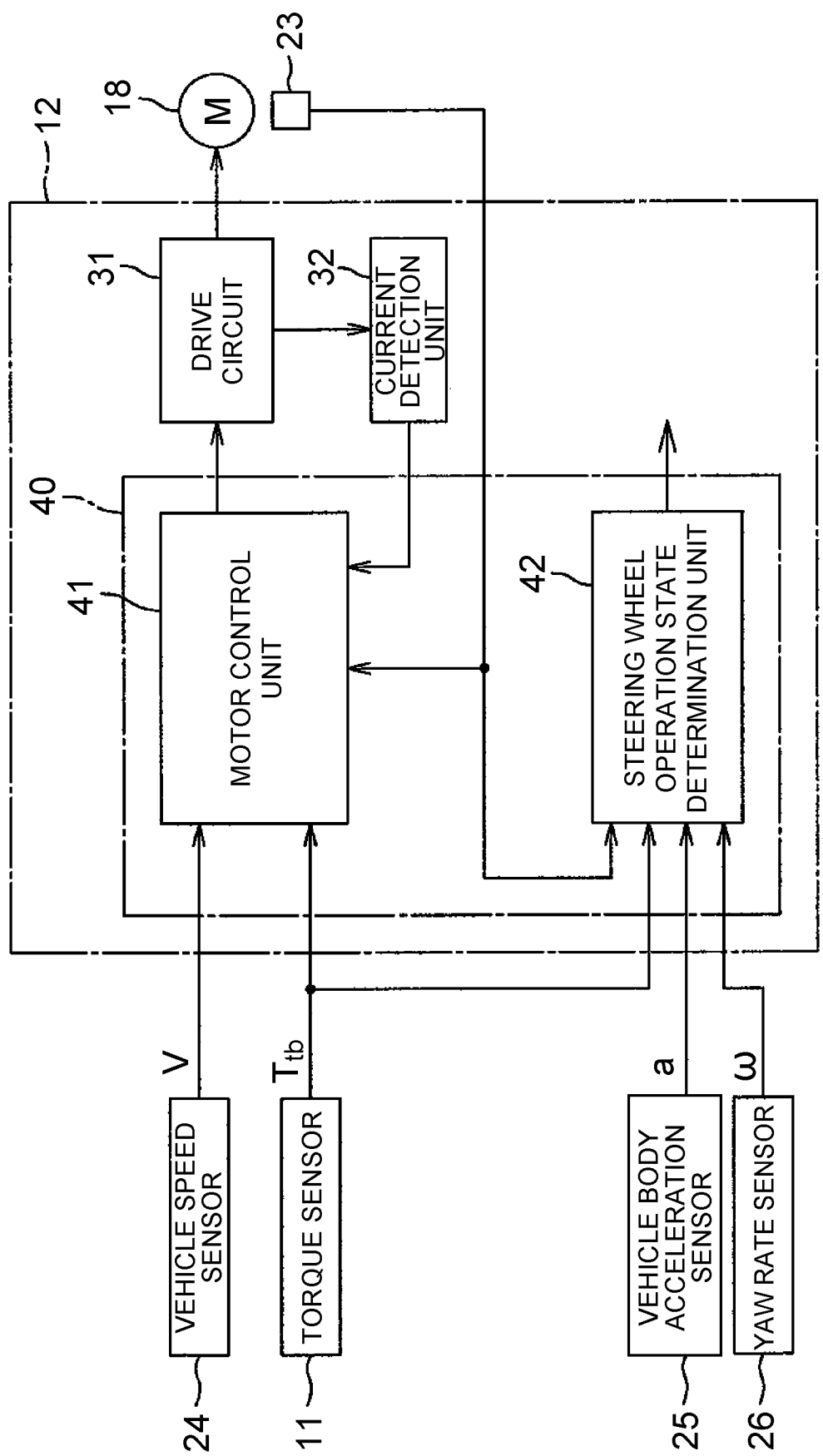
FIG. 2 is a block diagram showing an electric configuration of an ECU.

FIG. 2 is an outline diagram showing an electric configuration of the ECU 12. The ECU 12 includes a microcomputer 40, a drive circuit (three-phase inverter circuit) 31 that is controlled by the microcomputer 40 so as to supply electric power to the electric motor 18, and a current detection unit 32 that detects electric current flowing through the electric motor 18 (hereinafter, referred to as "motor current").

The microcomputer 40 includes a CPU and memories (a ROM, a RAM, a nonvolatile memory, and the like), and functions as a plurality of function processing units by executing predetermined programs. The plurality of function processing units includes a motor control unit 41 and a steering wheel operation state determination unit 42. The motor control unit 41 realizes a steering assist appropriate for a steering situation, by driving and controlling the drive circuit 31 based on the vehicle speed V detected by the vehicle speed sensor 24, the torsion bar torque $T_{tb}$ detected by the torque sensor 11, the rotor rotation angle computed based on the output of the rotation angle sensor 23, and the motor current detected by the current detection unit 32.

Specifically, the motor control unit 41 sets a current command value that is a target value of the motor current to flow through the electric motor 18, based on the torsion bar torque $T_{tb}$ and the vehicle speed V. The current command value corresponds to a target value of the steering assist force (assist torque) that is appropriate for a steering situation. The motor control unit 41 drives and controls the drive circuit 31 such that the motor current to be detected by the current detection unit 32 approaches the current command value.

The steering wheel operation state determination unit 42 determines whether the steering wheel operation state is a hands-on state where the driver is holding the steering wheel or a hands-off state (hands-free state) where the driver is not holding the steering wheel, based on the torsion bar torque $T_{tb}$ detected by the torque sensor 11, the rotor rotation angle computed based on the output of the rotation angle sensor 23, the vehicle body acceleration a detected by the vehicle body acceleration sensor 25, and the vehicle body rotation angular velocity co detected by the yaw rate sensor 26.

Figure 3:
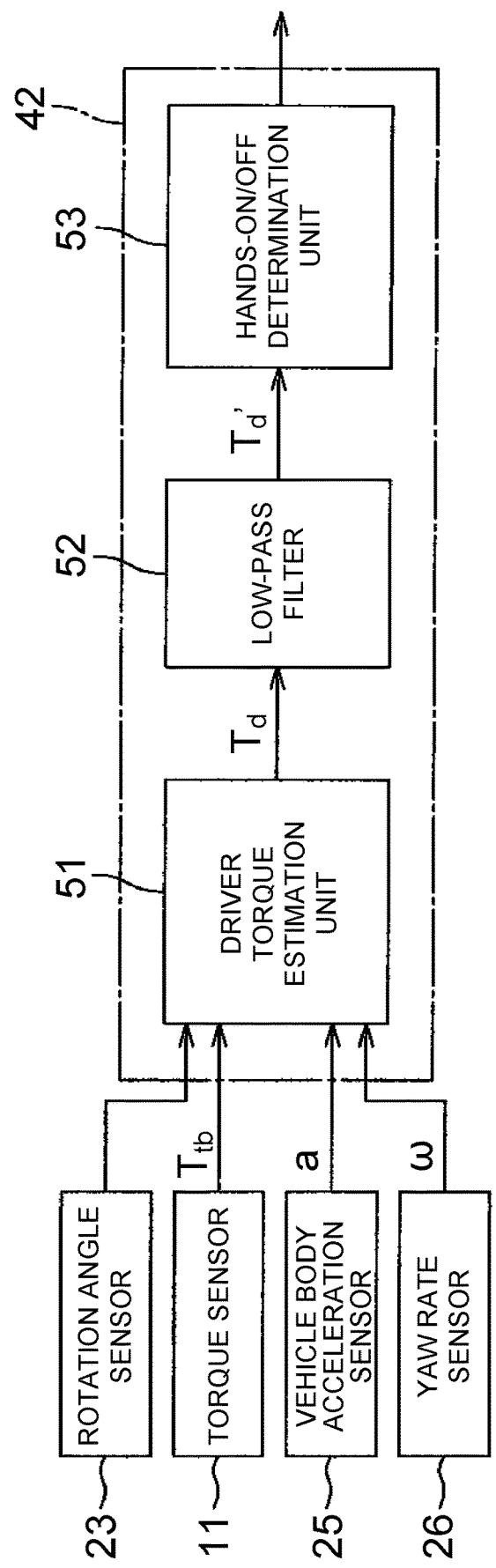
FIG. 3 is a block diagram showing an electric configuration of a steering wheel operation state determination unit.

FIG. 3 is a block diagram showing an electric configuration of the steering wheel operation state determination unit 42. The steering wheel operation state determination unit 42 includes a driver torque estimation unit 51, a low-pass filter 52, and a hands-on/off determination unit 53. The driver torque estimation unit 51 estimate a driver torque $T_d$ based on the output signal of the rotation angle sensor 23, the torsion bar torque $T_{tb}$ detected by the torque sensor 11, the vehicle body acceleration a detected by the vehicle body acceleration sensor 25, and the vehicle body rotation angular velocity co detected by the yaw rate sensor 26.

The low-pass filter 52 performs a low-pass filter process for the driver torque $T_d$ estimated by the driver torque estimation unit 51. The hands-on/off determination unit 53 determines whether the steering wheel operation state is the hands-on state or the hands-off state, based on a driver torque $T_d'$ after the low-pass filter process executed by the low-pass filter 52. They will be described below. In the embodiment, the driver torque estimation unit 51 computes the driver torque $T_d$ based on the following Expression (1).

$$Td = J_{sw} \cdot d^2\theta_{sw}/dt^2 + T_{tb} + T_c + T_g + T_{lat} + T_f \quad (1)$$

$J_{sw}$: steering wheel inertia moment $\theta_{sw}$: steering wheel angle estimation value (steering wheel rotation angle)

$d^2\theta_{sw}/dt^2$: steering wheel angle acceleration (second-order differential value of steering wheel angle estimation value)

$J_{sw} \cdot d^2\theta_{sw}/dt^2$: steering wheel inertia torque compensation value {=-(steering wheel inertia torque estimation value)} That is, the steering wheel inertia torque compensation value is a negative value of the steering wheel inertia torque estimation value.

$T_{tb}$: torsion bar torque (the torsion bar torque detected by the torque sensor 11 in the embodiment)

$T_c$: viscous friction torque compensation value {=-(viscous friction torque estimation value)} That is, the viscous friction torque compensation value is a negative value of the viscous friction torque estimation value.

$T_g$: gravity torque compensation value {=-(gravity torque estimation value)} That is, the gravity torque compensation value is a negative value of the gravity torque estimation value.

$T_{lat}$: lateral acceleration torque compensation value {=-(lateral acceleration torque estimation value)} That is, the lateral acceleration torque compensation value is a negative value of the lateral acceleration torque estimation value.

$T_f$: coulomb friction torque compensation value {=-(coulomb friction torque estimation value)} That is, the coulomb friction torque compensation value is a negative value of the coulomb friction torque estimation value.

In the embodiment, the signs of the torsion bar torque $T_{tb}$ and the driver torque $T_d$ are positive when the torque is in a leftward steering direction, and are negative when the torque is in a rightward steering direction. The steering wheel angle estimation value $\theta_{sw}$ indicates a forward or reverse rotation amount of the steering wheel from a neutral position. In the embodiment, the rotation amount in a leftward direction (counterclockwise direction) from the neutral position is a positive value, and the rotation amount in a rightward direction (clockwise direction) from the neutral position is a negative value.

The steering wheel inertia torque estimation value ($-J_{sw} \cdot d^2\theta_{sw}/dt^2$), the viscous friction torque estimation value ($-T_c$) and the coulomb friction torque estimation value ($-T_f$) act in the opposite direction of the direction of the driver torque $T_d$. Therefore, the signs of the viscous friction torque estimation value ($-T_c$) and the coulomb friction torque estimation value ($-T_f$) are opposite to the sign of the driver torque $T_d$. Accordingly, the signs of the steering wheel inertia torque compensation value $J_{sw} \cdot d^2\theta_{sw}/dt^2$, the viscous friction torque compensation value $T_c$ and the coulomb friction torque estimation value $T_f$ are the same as the sign of the driver torque $T_d$.

Depending on the steering wheel angle estimation value $\theta_{sw}$, the signs of the gravity torque estimation value ($-T_g$) and the lateral acceleration torque estimation value ($-T_{lat}$) can be the same as the direction of the driver torque $T_d$ or can be opposite to the direction of the driver torque $T_d$. Accordingly, depending on the steering wheel angle estimation value $\theta_{sw}$, the signs of the gravity torque compensation value $T_g$ and the lateral acceleration torque compensation value $T_{lat}$ can be the same as the direction of the driver torque $T_d$ or can be opposite to the direction of the driver torque $T_d$.

Computation Method for Steering Wheel Angle Estimation Value $\theta_{sw}$

The steering wheel angle estimation value $\theta_{sw}$ indicates an angle corresponding to the rotation amount from the neutral position and the rotation direction. The neutral position is a steering wheel position at which the orientation of the vehicle (vehicle body) is a straight direction. In the embodiment, in the case where the steering wheel angle estimation value $\theta_{sw}$ indicates the rotation amount from the neutral position in a counterclockwise direction, the steering wheel angle estimation value $\theta_{sw}$ is a positive value, and in the case where the steering wheel angle estimation value $\theta_{sw}$ indicates the rotation amount from the neutral position in a clockwise direction, the steering wheel angle estimation value $\theta_{sw}$ is a negative value.

The steering wheel angle estimation value $\theta_{sw}$ is expressed by the following Expression (2).

$$\theta_{sw} = (T_{tb}/k_{tb}) + \theta_{ww} \quad (2)$$

$k_{tb}$: the rigidity of the torsion bar 10

$\theta_{ww}$: the rotation angle (second shaft rotation angle) of the second shaft 9

The second shaft rotation angle $\theta_{ww}$ is computed based on the following Expression (3.1).

$$\theta_{ww} = (\theta_m/r_{wg}) + (T_m/k_{gear}) \tag{3.1}$$

$\theta_m$: the rotation angle of the electric motor 18 (the rotor rotation angle detected by the rotation angle sensor 23 in the embodiment)

$T_m$: motor torque estimation value $k_{gear}$: the rigidity between the worm gear and the worm wheel For example, the motor torque estimation value $T_m$ can be computed by multiplying the motor current detected by the current detection unit 32 (see FIG. 2) by a torque constant of the electric motor 18.

The second shaft rotation angle $\theta_{ww}$ may be computed based on the following Expression (3.2).

$$\theta_{ww} = \theta_m/r_{wg} \tag{3.2}$$

As can be seen from Expression (3.1), when $k_{gear}$ is large, the value of $(T_m/k_{gear})$ becomes a small value, and when $k_{gear}$ is small, the value of $(T_m/k_{gear})$ becomes a large value. Accordingly, when $k_{gear}$ is large, the second shaft rotation angle $\theta_{ww}$ may be computed based on Expression (3.2), and when $k_{gear}$ is small, the second shaft rotation angle $\theta_{ww}$ may be computed based on Expression (3.1).

Computation Method for Viscous Friction Torque Compensation Value $T_c$

The viscous friction torque estimation value $(-T_c)$ is an estimation value of the viscous friction torque that acts on the first shaft 8 and the steering wheel 2. The viscous friction torque is generated due to the slide of a bearing that supports the first shaft 8, the slide of a spiral cable that is connected to the steering wheel 2, and the like.

The viscous friction torque estimation value $(-T_c)$ is computed based on the following Expression (4-1).

$$-T_c = -G_c \cdot d\theta_{sw}/dt \tag{4-1}$$

$G_c$: viscous friction torque coefficient $d\theta_{sw}/dt$: steering wheel angular velocity (first-order differential value of $\theta_{sw}$)

Accordingly, the viscous friction torque compensation value $T_c$ is computed based on the following Expression (4-2).

$$T_c = G_c \cdot d\theta_{sw}/dt \tag{4-2}$$

The viscous friction torque coefficient $G_c$ can be evaluated as follows. The electric motor 18 is driven in the hands-free state, and the torsion bar torque $T_{tb}$ in a steady state is measured using the steering wheel angular velocity $d\theta_{sw}/dt$ as a parameter. The steady state means a state where the rotation angle acceleration is not generated in the steering wheel 2, that is, a state where the steering wheel angle acceleration $d^2\theta_{sw}/dt^2$ is zero. Then, the change rate (gradient) of the torsion bar torque $T_{tb}$ with respect to the steering wheel angular velocity $d\theta_{sw}/dt$ is evaluated as the viscous friction torque coefficient $G_c$. On this occasion, when the relation between the steering wheel angular velocity $d\theta_{sw}/dt$ and the torsion bar torque $T_{tb}$ is not a linear relation, the relation may be approximated by an arbitrary polynomial expression.

Figure 4:
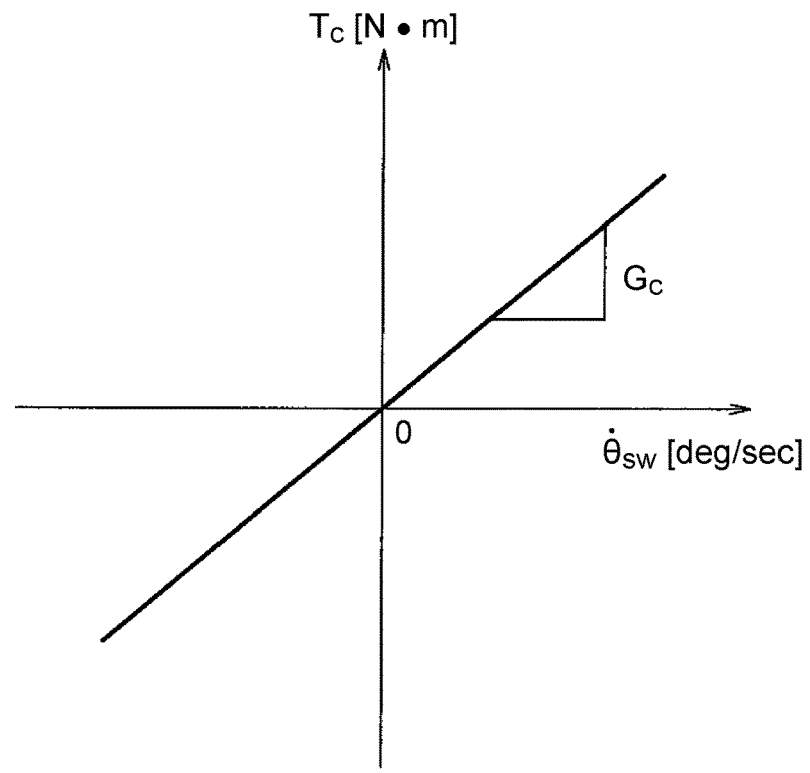
FIG. 4 is a graph showing an exemplary relation between a steering wheel angular velocity $d\theta_{sw}/dt$ and a viscous friction torque compensation value $T_c$.

FIG. 4 shows an exemplary relation between the steering wheel angular velocity $d\theta_{sw}/dt$ and the viscous friction torque compensation value $T_c$. The absolute value of the viscous friction torque compensation value $T_c$ increases as the absolute value of the steering wheel angular velocity $d\theta_{sw}/dt$ increases.

Computation Method for Gravity Torque Compensation Value $T_g$

Figure 5A:
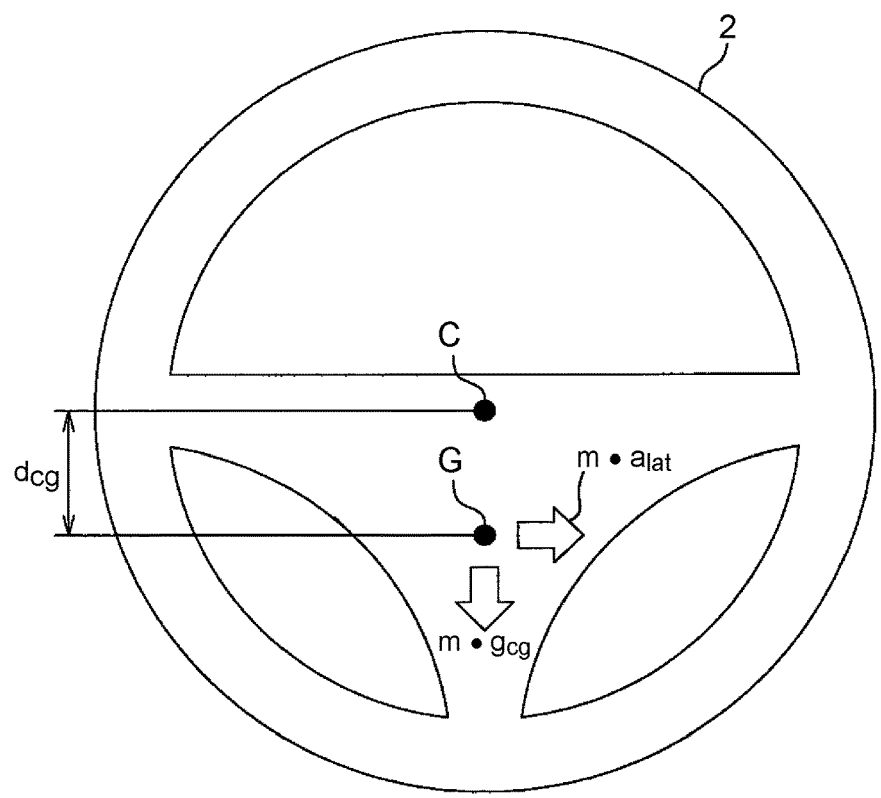
FIG. 5A is a schematic front view showing a gravity center position of the steering wheel and a central axis line of a first shaft.
Figure 5B:
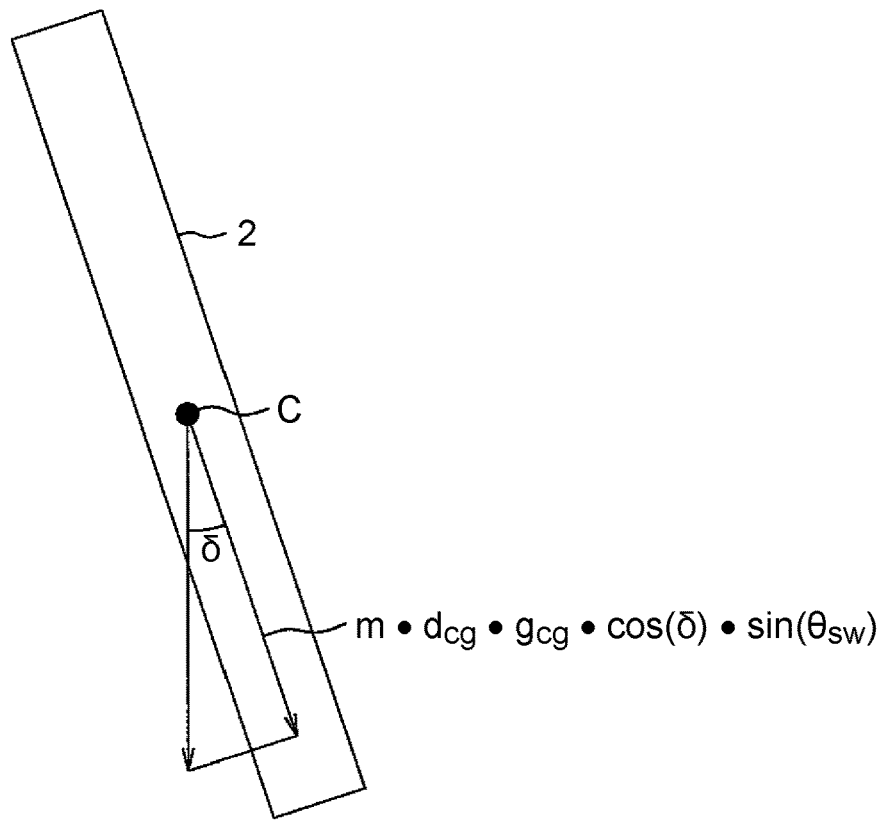
FIG. 5B is a schematic side view of FIG. 5A.

The gravity torque estimation value $(-T_g)$ will be described. As shown in FIG. 5A, a gravity center position G on a rotation plane of the steering wheel 2 does not coincide with a rotation center position C (an intersection point between the rotation plane of the steering wheel 2 and a central axis line of the first shaft 8). The distance between the gravity center position G on the rotation plane of the steering wheel 2 and the rotation center position C is referred to as an offset distance $d_{cg}$. Further, the mass of the steering wheel 2 is represented by m, and the gravity acceleration is represented by $g_{cg}$. Furthermore, as shown in FIG. 5B, the angle between a vertical line passing through the rotation center position C of the steering wheel 2 and the rotation plane of the steering wheel 2 in a state where the steering wheel 2 is mounted on the vehicle is referred to as a steering wheel tilt angle $\delta$.

The gravity torque estimation value $(-T_g)$ is an estimation value of a torque to be given to the first shaft 8 by a gravity $m \cdot g_{cg}$ that acts on the gravity center G of the steering wheel 2. Specifically, the gravity torque estimation value $(-T_g)$ is computed based on the following Expression (5-1).

$$-T_g = -G_{gr} \cdot \sin(\theta_{sw}) \tag{5-1}$$

$G_{gr}$ is a gravity torque coefficient, and is a value that depends on a product $m \cdot g_{cg} \cdot d_{cg} \cdot \cos(\delta)$ of the mass m of the steering wheel 2, the gravity acceleration $g_{cg}$, the offset distance $d_{cg}$, and a cosine value $\cos(\delta)$ of the steering wheel tilt angle $\delta$. Further, $\sin(\theta_{sw})$ is a sine value of the steering wheel angle estimation value $\theta_{sw}$.

Accordingly, the gravity torque compensation value $T_g$ is computed based on the following Expression (5-2).

$$T_g = G_{gr} \cdot \sin(\theta_{sw}) \tag{5-2}$$

When the offset distance $d_{cg}$, the mass m of the steering wheel 2, and the steering wheel tilt angle $\delta$ are found, the gravity torque coefficient $G_{gr}$ can be evaluated from the expression of $G_{gr} = m \cdot d_{cg} \cdot g_{cg} \cdot \cos(\delta)$.

Figure 6:
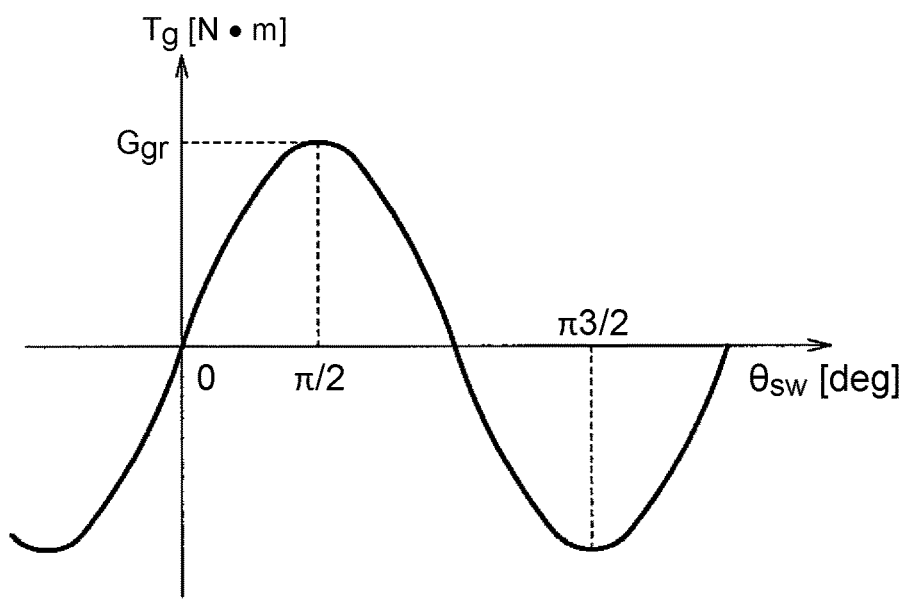
FIG. 6 is a graph showing an exemplary relation between a steering wheel angle estimation value $\theta_{sw}$ and a gravity torque compensation value $T_g$.

The gravity torque coefficient $G_{gr}$ can be evaluated as follows. That is, the torsion bar torque $T_{tb}$ in the steady state is measured in the hands-free state, using the steering wheel angle estimation value $\theta_{sw}$ as a parameter. The absolute value of the torsion bar torque $T_{tb}$ when the steering wheel angle estimation value $\theta_{sw}$ is 90 degrees is evaluated as the gravity torque coefficient $G_{gr}$. FIG. 6 shows an exemplary relation between the steering wheel angle estimation value $\theta_{sw}$ and the gravity torque compensation value $T_g$. The gravity $m \cdot g_{cg}$ that acts on the gravity center of the steering wheel 2 is a force in the vertical direction, and therefore, the absolute value of the gravity torque compensation value $T_g$ is maximized when the steering wheel angle estimation value $\theta_{sw}$ is ±90 [deg] or ±270 [deg].

Computation Method for Lateral Acceleration Torque Compensation Value $T_{Lat}$

The lateral acceleration torque estimation value $(-T_{lat})$ is an estimation value of a torque to be given to the first shaft 8 by an acceleration $a_{lat}$ in a vehicle-body-lateral direction that acts on the gravity center G of the steering wheel 2 (more specifically, a product $m \cdot a_{lat}$ of the acceleration $a_{lat}$ in the vehicle-body-lateral direction and the mass m of the steering wheel 2 (see FIG. 5A)).

Specifically, the lateral acceleration torque estimation value $(-T_{lat})$ is computed based on the following Expression (6-1).

$$-T_{lat} = -G_{lat} \cdot \cos(\theta_{sw}) \tag{6-1}$$

$G_{lat}$ is a lateral acceleration torque coefficient, and is a value that depends on a product $m \cdot a_{lat} \cdot d_{cg}$ of the mass m of the steering wheel 2, the acceleration $a_{lat}$ in the vehicle-body-lateral direction that acts on the gravity center G of the steering wheel 2, and the offset distance $d_{cg}$. Further, cos $(\theta_{sw})$ is a cosine value of the steering wheel angle estimation value $\theta_{sw}$.

Accordingly, the lateral acceleration torque compensation value $T_{lat}$ is computed based on the following Expression (6-2).

$$T_{lat} = G_{lat} \cdot \cos(\theta_{sw}) \qquad (6\text{-}2)$$

For example, the lateral acceleration torque coefficient $G_{lat}$ is evaluated as follows. That is, a vehicle-body-lateral component of the vehicle body acceleration measured by the vehicle body acceleration sensor 25 is evaluated as $a_{lat1}$. A vehicle-body-lateral component of a centrifugal acceleration that is a product of the square of the vehicle body rotation angular velocity ω measured by the yaw rate sensor 26 and the offset distance $d_{cg}$ is evaluated as $a_{lat2}$. The sum $(a_{lat1} + a_{lat2})$ of the vehicle-body-lateral component $a_{lat1}$ of the vehicle body acceleration and the vehicle-body-lateral component $a_{lat2}$ of the centrifugal acceleration is evaluated as the acceleration $a_{lat}$ in the vehicle-body-lateral direction that acts on the gravity center G of the steering wheel 2. Then, the lateral acceleration torque coefficient $G_{lat}$ is evaluated from the expression of $G_{lat} = m \cdot a_{lat} \cdot d_{cg}$. The lateral acceleration torque coefficient $G_{lat}$ changes depending on the traveling state of the vehicle.

Figure 7:
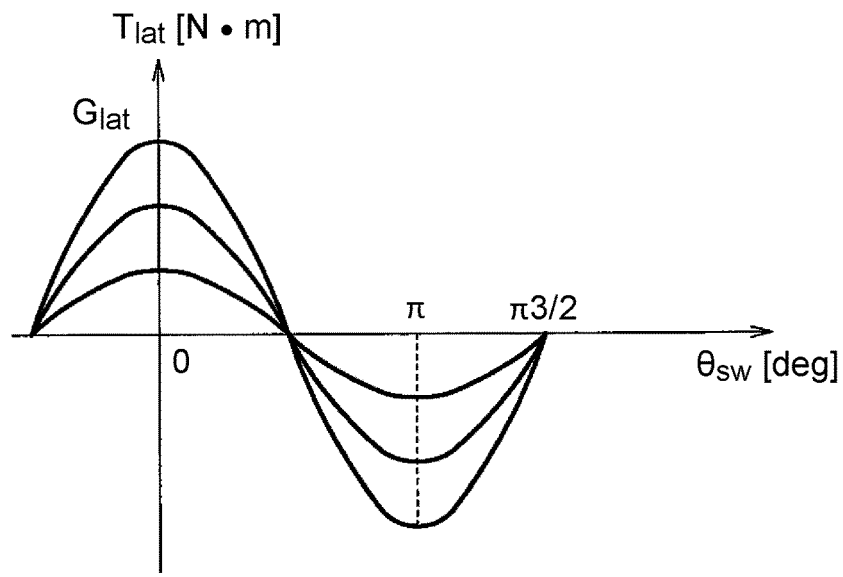
FIG. 7 is a graph showing an exemplary relation between the steering wheel angle estimation value $\theta_{sw}$ and a lateral acceleration torque compensation value $T_{lat}$.

FIG. 7 shows an exemplary relation between the steering wheel angle estimation value $\theta_{sw}$ and the lateral acceleration torque compensation value $T_{lat}$. The acceleration $a_{lat}$ in the vehicle-body-lateral direction that acts on the gravity center G of the steering wheel 2 is a force in the lateral direction, and therefore, the absolute value of the lateral acceleration torque compensation value $T_{lat}$ is maximized when the steering wheel angle estimation value $\theta_{sw}$ is 0 [deg] or 180 [deg].

Computation Method for Coulomb Friction Torque Compensation Value $T_f$

The coulomb friction torque estimation value $(-T_f)$ is an estimation value of a coulomb friction torque that acts on the first shaft 8 and the steering wheel 2. The coulomb friction torque is generated by the bearing that supports the first shaft 8, the spiral cable that is connected to the steering wheel 2, and the like.

The coulomb friction torque estimation value $(-T_f)$ is computed based on the following Expression (7-1).

$$(-T_f) = -G_f \tan h(\eta \cdot d\theta_{sw}/dt) \qquad (7\text{-}1)$$

$G_f$: coulomb friction torque coefficient
η: is coulomb friction torque gradient Accordingly, the coulomb friction torque compensation value $T_f$ is computed based on the following Expression (7-2).

$$T_f = G_f \tan h(\eta \cdot d\theta_{sw}/dt) \qquad (7\text{-}2)$$

The coulomb friction torque coefficient $G_f$ can be evaluated as follows. The motor torque to be applied to the second shaft 9 by the electric motor 18 is gradually increased in the hands-free state. Then, the absolute value of the torsion bar torque $T_{tb}$ at the time point when the absolute value of the steering wheel angular velocity $d\theta_{sw}/dt$ becomes zero, that is, at the time point when the steering wheel 2 starts to move is evaluated as the coulomb friction torque coefficient $G_f$. The coulomb friction torque gradient η is determined by tuning.

Figure 8:
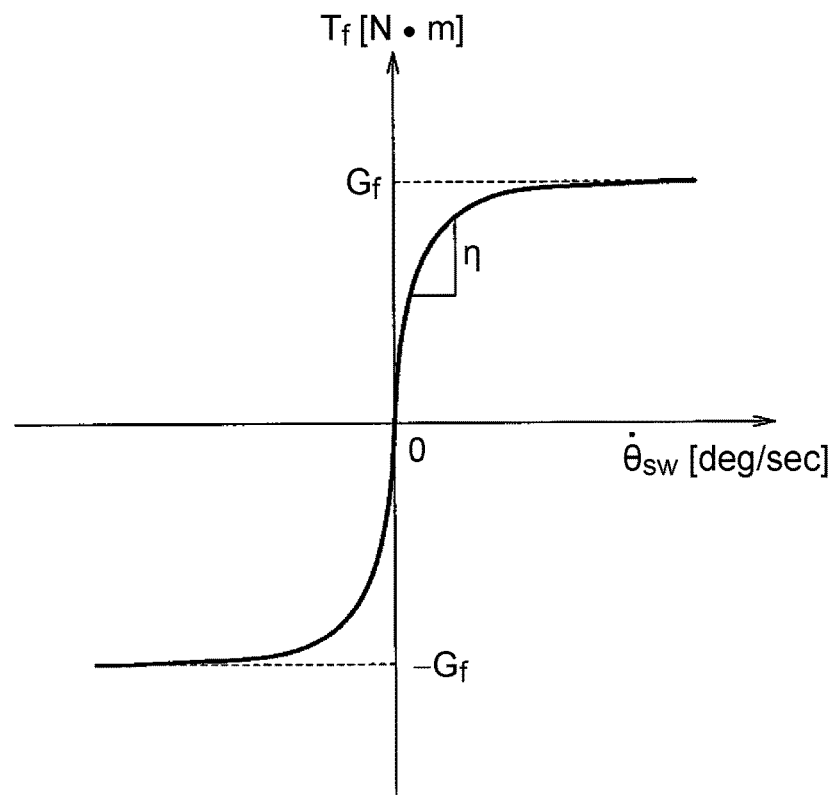
FIG. 8 is a graph showing an exemplary relation between the steering wheel angular velocity $d\theta_{sw}/dt$ and a coulomb friction torque compensation value $T_f$.

FIG. 8 shows an exemplary relation between the steering wheel angular velocity $d\theta_{sw}/dt$ and the coulomb friction torque compensation value $T_f$. When the absolute value of the steering wheel angular velocity $d\theta_{sw}/dt$ increases from zero, the absolute value of the coulomb friction torque compensation value $T_f$ increases at a relatively higher change rate in a range in which the absolute value of the steering wheel angular velocity $d\theta_{sw}/dt$ is small, and then, converges at the magnitude of the coulomb friction torque coefficient $G_f$. In the range in which the absolute value of the steering wheel angular velocity $d\theta_{sw}/dt$ is small, the change rate of the coulomb friction torque compensation value $T_f$ with respect to the steering wheel angular velocity $d\theta_{sw}/dt$ increases as the coulomb friction torque gradient η increases.

Figure 9:
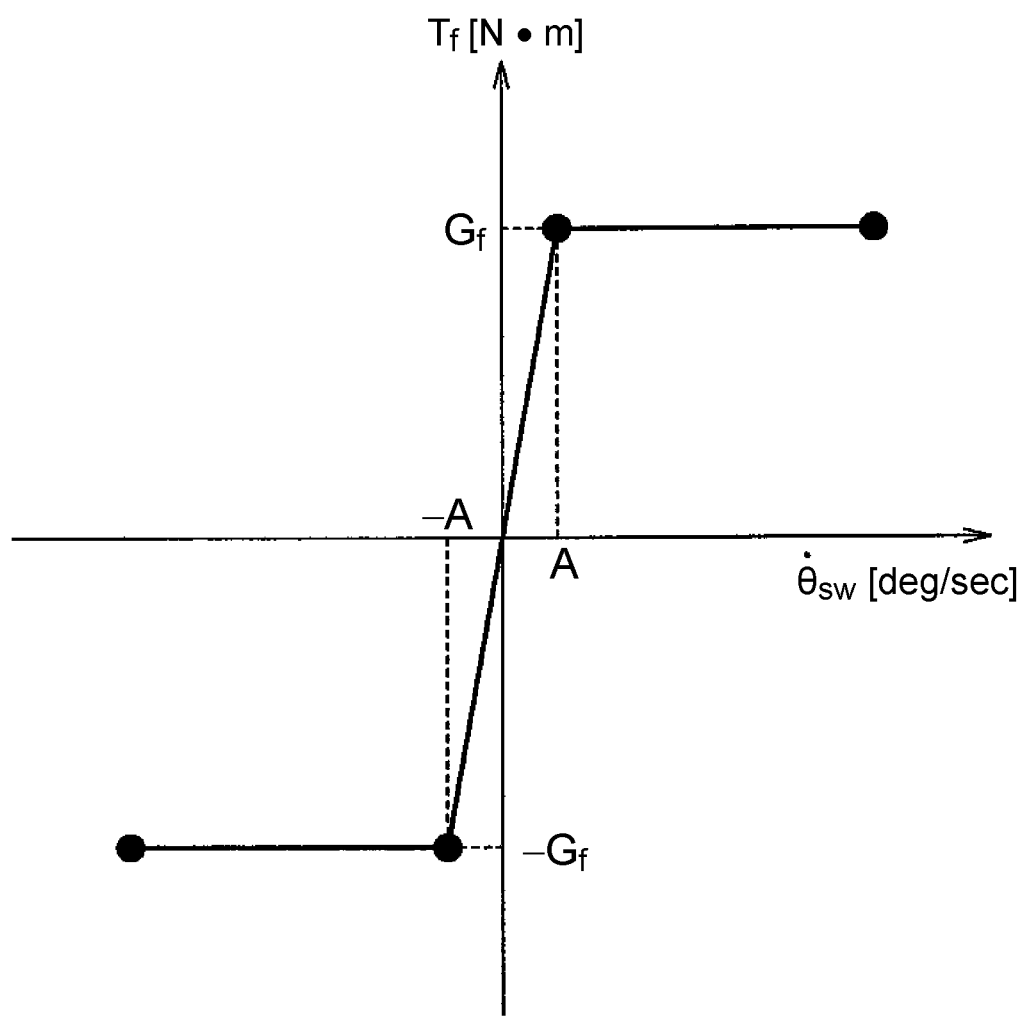
FIG. 9 is a graph showing another exemplary relation between the steering wheel angular velocity $d\theta_{sw}/dt$ and the coulomb friction torque compensation value $T_f$.

A map indicating the relation between the steering wheel angular velocity $d\theta_{sw}/dt$ and the coulomb friction torque compensation value $T_f$ may be created in advance, and the coulomb friction torque compensation value $T_f$ may be computed based on the map. In this case, the relation between the steering wheel angular velocity $d\theta_{sw}/dt$ and the coulomb friction torque compensation value $T_f$ may be a relation shown in FIG. 9. In this example, in a range in which the steering wheel angular velocity $d\theta_{sw}/dt$ is −A or lower, the value of the coulomb friction torque compensation value $T_f$ is $-G_f$. In a range in which the steering wheel angular velocity $d\theta_{sw}/dt$ is +A or higher, the value of the coulomb friction torque compensation value $T_f$ is $+G_f$. In a range in which the steering wheel angular velocity $d\theta_{sw}/dt$ is higher than −A and lower than +A, the coulomb friction torque compensation value $T_f$ linearly changes from $-G_f$ to $+G_f$ with increase in the steering wheel angular velocity $d\theta_{sw}/dt$.

Figure 10:
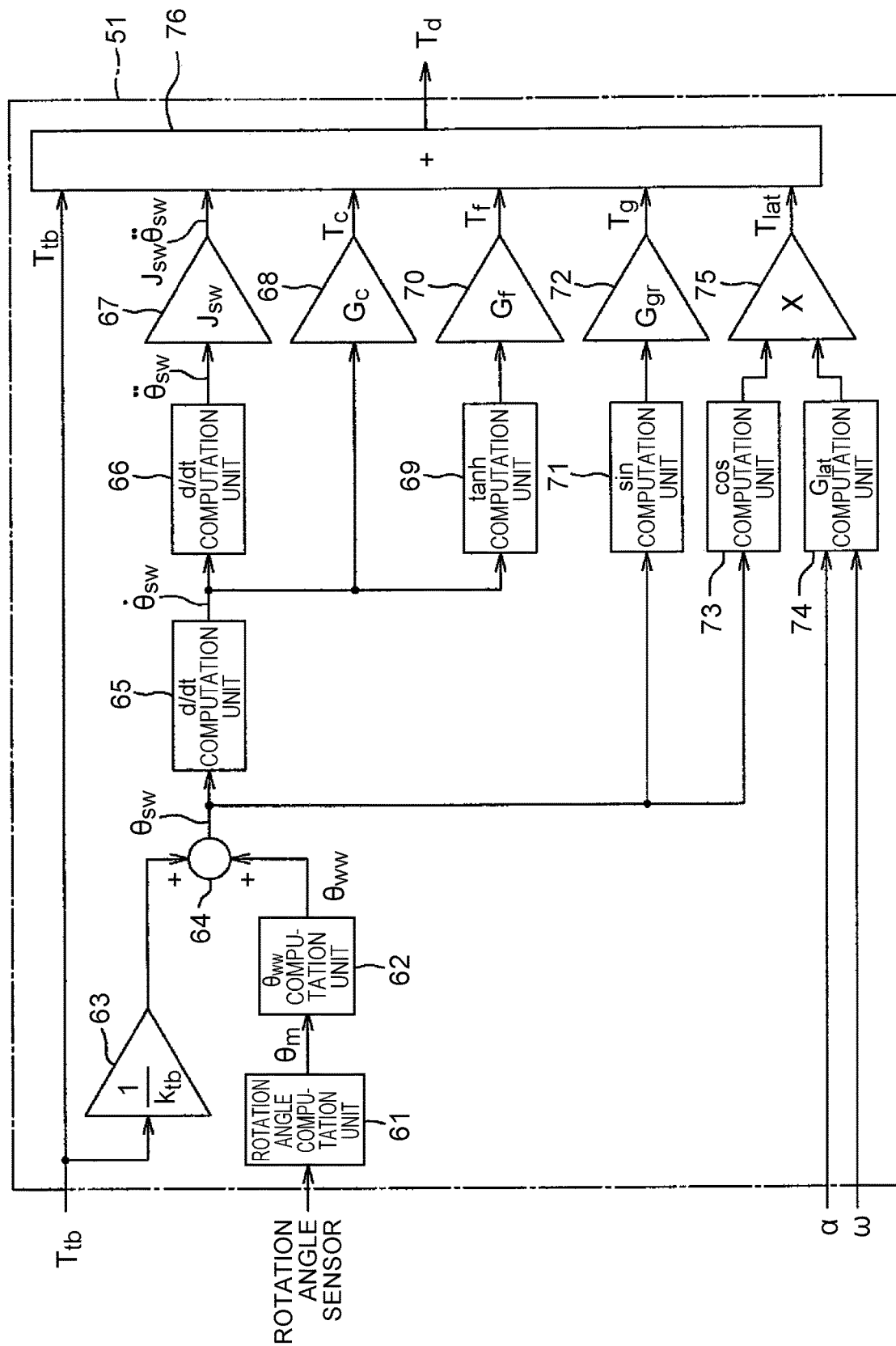
FIG. 10 is a block diagram showing a configuration of a driver torque estimation unit.

FIG. 10 is a block diagram showing a configuration of the driver torque estimation unit 51. The driver torque estimation unit 51 includes a rotor rotation angle computation unit 61, a second shaft rotation angle computation unit ($\theta_{ww}$ computation unit) 62, a first multiplication unit 63, a first addition unit 64, a first differentiation computation unit 65, a second differentiation computation unit 66, and a second multiplication unit 67. Furthermore, the driver torque estimation unit 51 includes a third multiplication unit 68, a tan h computation unit 69, a fourth multiplication unit 70, a sin computation unit 71, a fifth multiplication unit 72, a cos computation unit 73, an acceleration torque coefficient computation unit ($G_{lat}$ computation unit) 74, and a sixth multiplication unit 75, and a second addition unit 76.

The rotor rotation angle computation unit 61 computes the rotation angle (rotor rotation angle) θm of the electric motor 18, based on the output signal of the rotation angle sensor 23. The second shaft rotation angle computation unit ($\theta_{ww}$ computation unit) 62 computes the second shaft rotation angle $\theta_{ww}$ based on Expression (3.1). The second shaft rotation angle computation unit ($\theta_{ww}$ computation unit) 62 may compute the second shaft rotation angle $\theta_{ww}$ based on Expression (3.2).

The first multiplication unit 63 multiplies the torsion bar torque $T_{tb}$ detected by the torque sensor 11, by the reciprocal of the rigidity $k_{th}$ of the torsion bar 10. The first addition unit 64 computes the steering wheel angle estimation value $\theta_{sw}$, by adding the second shaft rotation angle $\theta_{ww}$ computed by the second shaft rotation angle computation unit 62, to the multiplication result $T_{tb}/k_{tb}$ of the first multiplication unit 63 (see Expression (2)).

The first differentiation computation unit 65 computes the steering wheel angular velocity $d\theta_{sw}/dt$, by performing temporal differentiation for the steering wheel angle estimation value $\theta_{sw}$ computed by the first addition unit 64. The second differentiation computation unit 66 computes the steering wheel angle acceleration $d^2\theta_{sw}/dt^2$, by performing temporal differentiation for the steering wheel angular velocity $d\theta_{sw}/dt$ computed by the first differentiation computation unit 65. The second multiplication unit 67 computes the steering wheel inertia torque compensation value $J_{sw} \cdot d^2\theta_{sw}/dt^2$, by multiplying the steering angle acceleration $d^2\theta_{sw}/dt^2$ computed by the second differentiation computation unit 66, by the steering wheel inertia moment $J_{sw}$.

The third multiplication unit 68 computes the viscous friction torque compensation value $T_c$, by multiplying the steering wheel angular velocity $d\theta_{sw}/dt$ computed by the first differentiation computation unit 65, by the viscous friction torque coefficient $G_c$ (see Expression (4-2)). The tan h computation unit 69 computes $\tan h(\eta \cdot d\theta_{sw}/dt)$, using the steering wheel angular velocity $d\theta_{sw}/dt$ computed by the first differentiation computation unit 65 and the coulomb friction torque gradient $\eta$. The fourth multiplication unit 70 computes the coulomb friction torque compensation value $T_f$, by multiplying $\tan h(\eta \cdot d\theta_{sw}/dt)$ computed by the tan h computation unit 69, by the coulomb friction torque coefficient $G_f$ (see Expression (7-2)).

The sin computation unit 71 computes the sine value $\sin(\theta_{sw})$ of the steering wheel angle estimation value $\theta_{sw}$ computed by the first addition unit 64. The fifth multiplication unit 72 computes the gravity torque compensation value $T_g$, by multiplying the sine value $\sin(\theta_{sw})$ of the steering wheel angle estimation value $\theta_{sw}$ computed by the sin computation unit 71, by the gravity torque coefficient $G_{gr}$ (see Expression (5-2)). The cos computation unit 73 computes the cosine value $\cos(\theta_{sw})$ of the steering wheel angle estimation value $\theta_{sw}$ computed by the first addition unit 64. The acceleration torque coefficient computation unit ($G_{lat}$ computation unit) 74 evaluates the acceleration $a_{lat}$ in the vehicle-body-lateral direction that acts on the gravity center G of the steering wheel 2, based on the vehicle body acceleration a measured by the vehicle body acceleration sensor 25 and the vehicle body rotation angular velocity $\omega$ measured by the yaw rate sensor 26, as described above. Then, the acceleration torque coefficient computation unit 74 evaluates the lateral acceleration torque coefficient $G_{lat}$ from the expression of $G_{lat} = m \cdot a_{lat} \cdot d_{cg}$.

The sixth multiplication unit 75 computes the lateral acceleration torque compensation value $T_{lat}$, by multiplying the lateral acceleration torque coefficient $G_{lat}$ computed by the acceleration torque coefficient computation unit 74, by the cosine value $\cos(\theta_{sw})$ of the steering wheel angle estimation value $\theta_{sw}$ computed by the cos computation unit 73 (see Expression (6-2)). The second addition unit 76 computes the driver torque (estimation value) $T_d$, by adding $J_{sw} \cdot d^2\theta_{sw}/dt^2$, $T_c$, $T_f$, $T_g$ and $T_{lat}$ respectively computed by the second, third, fourth, fifth and sixth multiplication units 67, 68, 70, 72, 75, to the torsion bar torque $T_{tb}$ detected by the torque sensor 11.

In the embodiment, the driver torque $T_d$ is computed in consideration of the viscous friction torque estimation value ($-T_c$), the gravity torque estimation value ($-T_g$), the coulomb friction torque estimation value ($-T_f$) and the lateral acceleration torque estimation value ($-T_{lat}$), in addition to the steering wheel inertia torque estimation value ($-J_{sw} \cdot d^2\theta_{sw}$) and the torsion bar torque $T_{tb}$. Therefore, the driver torque can be estimated at a high accuracy.

Back to FIG. 3, the low-pass filter 52 attenuates a frequency component having a higher frequency than a predetermined cut-off frequency $f_c$, in the driver torque $T_d$ computed by the driver torque estimation unit 51. The cut-off frequency $f_c$ is set, for example, to a value in a range larger than or equal to 3 [Hz] and lower than or equal to 7 [Hz] or lower. In the embodiment, the low-pass filter 52 is a second-order Butterworth filter. The driver torque $T_d'$ after the low-pass filter process executed by the low-pass filter 52 is given to the hands-on/off determination unit 53

Figure 11:
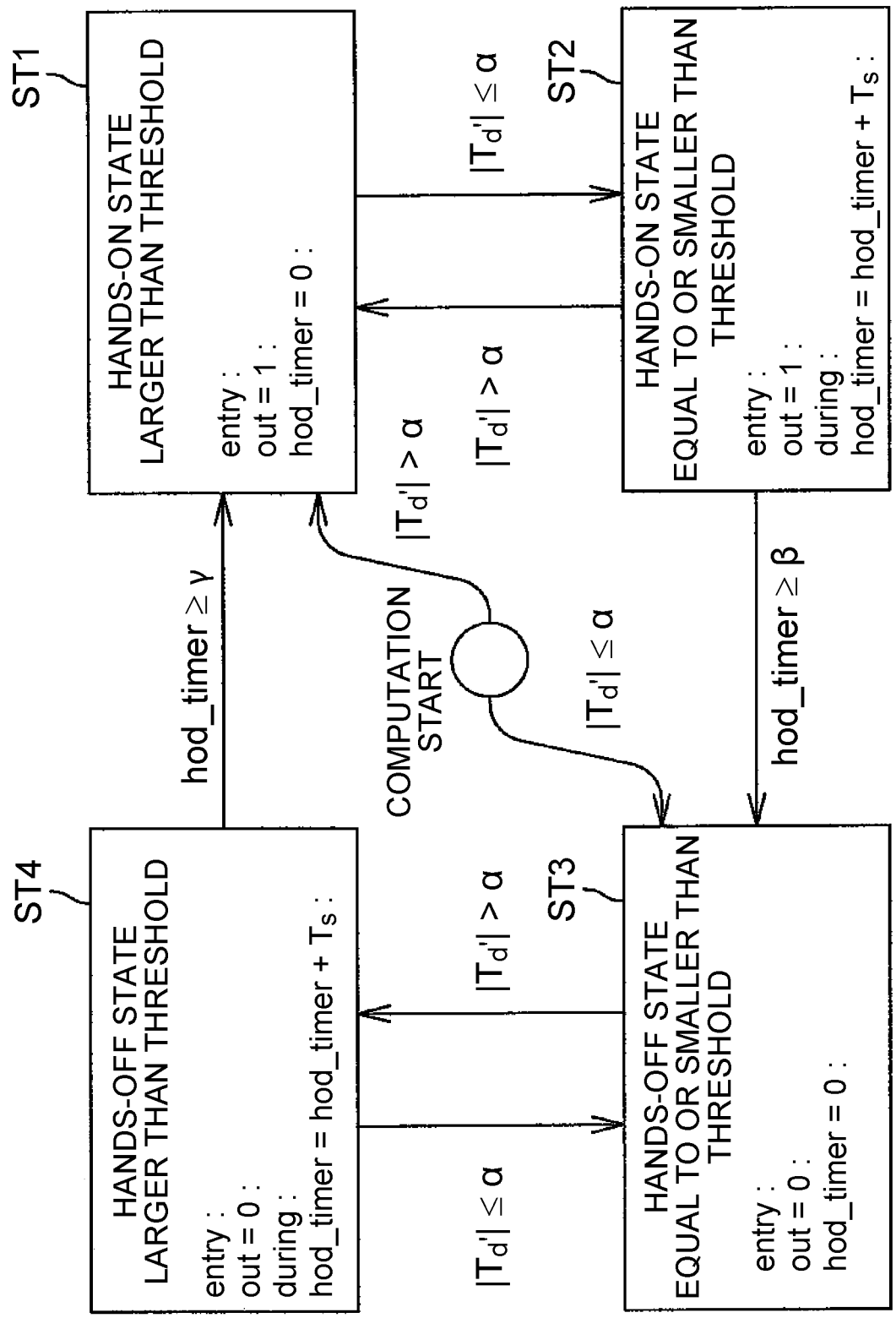
FIG. 11 is a state transition diagram for describing an operation of a hands-on/off determination unit.

FIG. 11 is a state transition diagram for describing an operation of the hands-on/off determination unit 53. In the description of the operation of the hands-on/off determination unit 53, the driver torque $T_d'$ after the low-pass filter process by the low-pass filter 52 is referred to as merely "driver torque $T_d'$". As steering wheel operation states of the driver, the hands-on/off determination unit 53 discriminates four states: a "hands-on state larger than a threshold (ST1)", a "hands-on state equal to or smaller than a threshold (ST2)", a "hands-off state equal to or smaller than a threshold (ST3)", and a "hands-off state larger than a threshold (ST4)".

The "hands-on state larger than a threshold (ST1)" is a hands-on state where the absolute value of the driver torque $T_d'$ is larger than a predetermined threshold $\alpha$ (>0). The "hands-on state equal to or smaller than a threshold (ST2)" is a hands-on state where the absolute value of the driver torque $T_d'$ is equal to or smaller than the threshold $\alpha$. The "hands-off state equal to or smaller than a threshold (ST3)" is a hands-off state where the absolute value of the driver torque $T_d'$ is equal to or smaller than the threshold $\alpha$. The "hands-off state larger than a threshold (ST4)" is a hands-off state where the absolute value of the driver torque $T_d'$ is larger than the threshold $\alpha$. The threshold $\alpha$ is set to a value in a range of 0.1 [Nm] or more and 0.3 [Nm] or less.

When the absolute value of the driver torque $T_d'$ is larger than the threshold $\alpha$ at the start of the computation, the hands-on/off determination unit 53 determines that the steering wheel operation state is the "hands-on state larger than a threshold (ST1)". Then, the hands-on/off determination unit 53 sets an output signal (out) to "1", and sets a time counter value hod_timer to zero. As for the output signal (out), which is a signal indicating the determination result, "1" indicates that the determination result is the hands-on, and "0" indicates that the determination result is the hands-off.

When the absolute value of the driver torque $T_d'$ becomes equal to or smaller than the threshold $\alpha$ in the "hands-on state larger than a threshold (ST1)", the hands-on/off determination unit 53 determines that the steering wheel operation state is the "hands-on state equal to or smaller than a threshold (ST2)". Then, the hands-on/off determination unit 53 sets the output signal (out) to "1". While the hands-on/off determination unit 53 determines that the steering wheel operation state is the "hands-on state equal to or smaller than a threshold (ST2)", the hands-on/off determination unit 53 updates the time counter value hod_timer to a value resulting from adding a predetermined time $T_s$ [sec] to the current value (hod_timer), whenever the predetermined time $T_s$ [sec] elapses.

When the absolute value of the driver torque $T_d'$ becomes larger than the threshold $\alpha$ in the "hands-on state equal to or smaller than a threshold (ST2)" before the time counter value hod_timer reaches a predetermined hands-off determination threshold $\beta$ (>0), the hands-on/off determination unit 53 determines that the steering wheel operation state is the "hands-on state larger than a threshold (ST1)", and sets the time counter value hod_timer to zero.

When the absolute value of the driver torque $T_d'$ does not become larger than the threshold $\alpha$ and the time counter value hod_timer reaches the hands-off determination threshold β in the "hands-on state equal to or smaller than a threshold (ST2)", the hands-on/off determination unit 53 determines that the steering wheel operation state is the "hands-off state equal to or smaller than a threshold (ST3)". Then, the hands-on/off determination unit 53 sets the output signal (out) to "0", and sets the time counter value hod_timer to zero. The hands-off determination threshold β is set, for example, to a value in a range of 0.5 [sec] or more and 1.0 [sec] or less.

When the absolute value of the driver torque $T_d'$ is larger than the threshold α in the "hands-off state equal to or smaller than a threshold (ST3)", the hands-on/off determination unit 53 determines that the steering wheel operation state is the "hands-off state larger than a threshold (ST4)". Then, the hands-on/off determination unit 53 sets the output signal (out) to "0". While the hands-on/off determination unit 53 determines that the steering wheel operation state is the "hands-off state larger than a threshold (ST4)", the hands-on/off determination unit 53 updates the time counter value hod_timer to a value resulting from adding the predetermined time $T_s$ [sec] to the current value (hod_timer), whenever the predetermined time $T_s$ [sec] elapses.

When the absolute value of the driver torque $T_d'$ becomes equal to or smaller than the threshold α in the "hands-off state larger than a threshold (ST4)" before the time counter hod_timer reaches a predetermined hands-on determination threshold γ (>0), the hands-on/off determination unit 53 determines that the steering wheel operation state is the "hands-off state equal to or smaller than a threshold (ST3)", and sets the time counter value hod_timer to zero. The hands-on determination threshold γ is set, for example, to a value in a range of 0.05 [sec] or more and 0.1 [sec] or less.

When the absolute value of the driver torque $T_d'$ does not become equal to or smaller than the threshold α and the time counter value hod_timer reaches the hands-on determination threshold γ in the "hands-off state larger than a threshold (ST4)", the hands-on/off determination unit 53 determines that the steering wheel operation state is the "hands-on state larger than a threshold (ST1)". Then, the hands-on/off determination unit 53 sets the output signal (out) to "1", and sets the time counter value hod_timer to zero.

When the absolute value of the driver torque $T_d'$ is equal to or smaller than the threshold α at the start of the computation, the hands-on/off determination unit 53 determines that the steering wheel operation state is the "hands-off state equal to or smaller than a threshold (ST3)". Then, the hands-on/off determination unit 53 sets the output signal (out) to "0", and sets the time counter value hod_timer to zero. In the first embodiment, the driver torque $T_d$ is estimated by the driver torque estimation unit 51, at a high accuracy. Then, the high-frequency component of the estimated driver torque $T_d$ is removed. Based on the driver torque $T_d'$ after the removal of the high-frequency component, the hands-on/off determination is performed using the torque threshold α and the time counter value hod_timer. Therefore, it is possible to determine whether the steering wheel operation state is a hands-on state where the driver is holding the steering wheel or a hands-off state where the driver is not holding the steering wheel, at a high accuracy.

The hands-on/off determination result can be used for a mode switching control in a vehicle having an automatic driving mode and a manual driving mode as driving modes. For example, in the switching of the driving mode from the automatic driving mode to the manual driving mode, the hands-on/off determination result can be used for confirming the hands-on state before switching to the manual driving mode. The first embodiment of the disclosure has been described above. The disclosure can be carried out as other embodiments.

For example, in the first embodiment, the driver torque estimation unit 51 computes the driver torque $T_d$ based on Expression (1), but the driver torque estimation unit 51 may compute the driver torque $T_d$ based on the following Expressions (8), (9), (10) or (11).

$$T_d = J_{sw} \cdot d^2\theta_{sw}/dt^2 + T_{tb} + T_g \quad (8)$$

$$T_d = J_{sw} \cdot d^2\theta_{sw}/dt^2 + T_{tb} + T_c + T_g \quad (9)$$

$$T_d = J_{sw} \cdot d^2\theta_{sw}/dt^2 + T_{tb} + T_c + T_g + T_f \quad (10)$$

$$T_d = J_{sw} \cdot d^2\theta_{sw}/dt^2 + T_{tb} + T_c + T_g + T_{lat} \quad (11)$$

In the first embodiment, the driver torque $T_d$ is computed by adopting the steering wheel angle estimation value $\theta_{sw}$ computed using the torsion bar torque $T_{tb}$ and the second shaft rotation angle $\theta_{ww}$, as the rotation angle of the steering wheel 2. However, the driver torque $T_d$ may be computed by adopting the second shaft rotation angle $\theta_{ww}$ as the rotation angle of the steering wheel 2. Further, a steering angle sensor that detects the rotation angle of the steering wheel 2 may be provided on the first shaft 8, and the driver torque $T_d$ may be computed based on the rotation angle of the steering wheel 2 that is detected by the steering angle sensor. Further, a rotation angle sensor that detects the second shaft rotation angle $\theta_{ww}$ may be provided on the second shaft 9, such that the rotation angle $\theta_{ww}$ of the second shaft 9 is directly detected.

In the first embodiment, the low-pass filter 52 in the steering wheel operation state determination unit 42 (see FIG. 3) is provided on the downstream side of the driver torque estimation unit 51. However, the low-pass filter 52 may be provided on the upstream side of the driver torque estimation unit 51. In the first embodiment, the electric motor 18 is a three-phase brushless motor. However, the electric motor 18 may be a direct-current motor with a brush.

Figure 12:
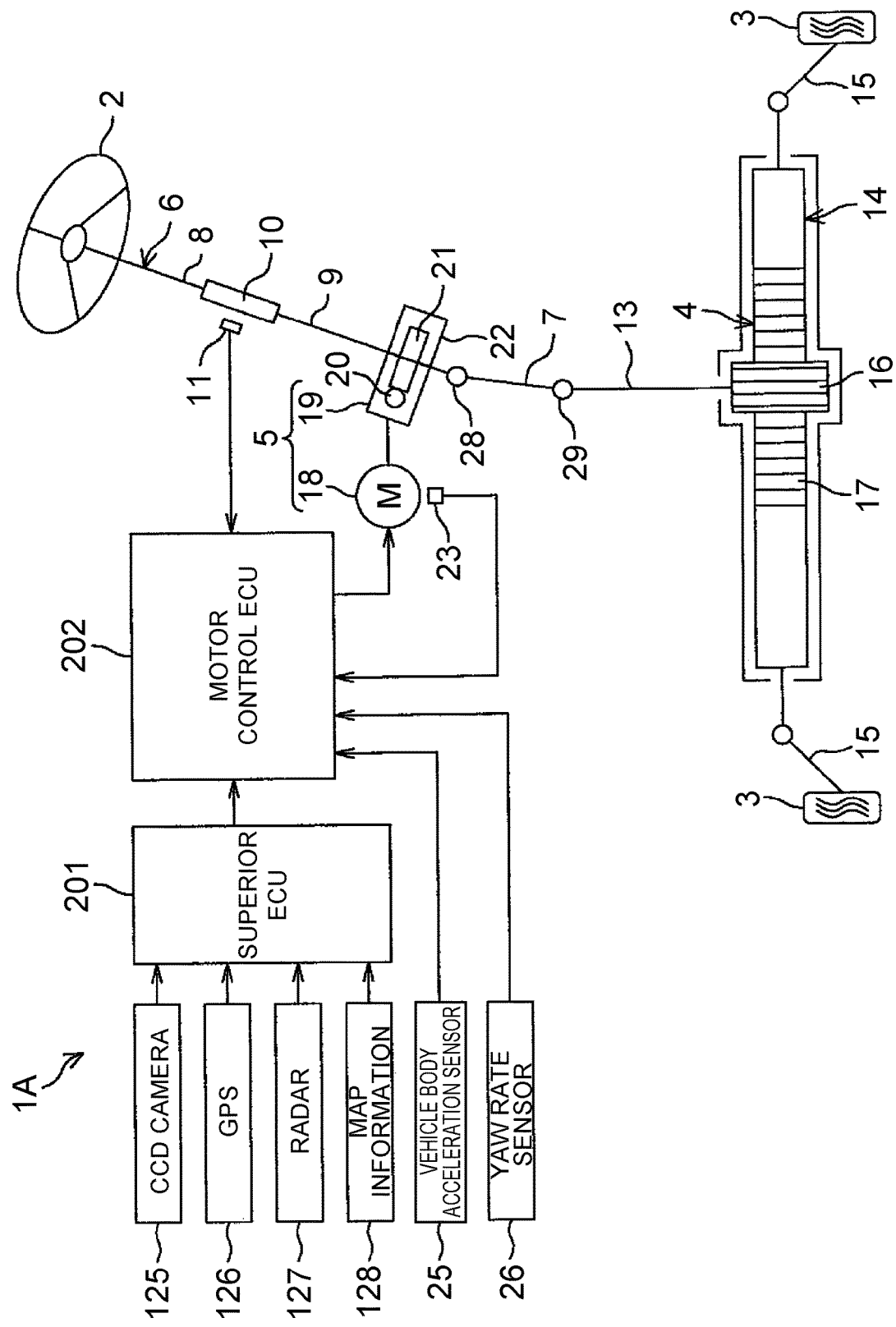
FIG. 12 is a schematic view showing a brief configuration of an electric power steering system to which a motor control apparatus according to a second embodiment of the disclosure is applied.

FIG. 12 is a schematic view showing a brief configuration of an electric power steering apparatus to which a steering apparatus according to a second embodiment of the disclosure is applied. In FIG. 12, parts corresponding to the above-described parts in FIG. 1 are denoted by the same reference characters. The mechanical configuration of an electric power steering apparatus 1A in FIG. 12 is the same as the mechanical configuration of the electric power steering apparatus 1 in FIG. 1, and therefore, the description is omitted. In the second embodiment, the reduction ratio of the reduction drive 19 is represented by N.

The vehicle is equipped with a charge coupled device (CCD) camera 125 that photographs a forward road in the running direction of the vehicle, a global positioning system (GPS) 126 that detects the vehicle position, a radar 127 that detects a road form and an obstacle, and a map information memory 128 in which map information is stored. The CCD camera 125, the GPS 126, the radar 127 and the map information memory 128 are connected to a superior electronic control unit (ECU) 201 for performing an automatic assist control or an automatic driving control. Based on pieces of information obtained by the CCD camera 125, the GPS 126 and the radar 127 and map information, the superior ECU 201 performs surrounding environment recognition, vehicle position estimation, route planning, and the like, and determines target control values for steering and drive actuators.

In the embodiment, the superior ECU 201 sets an automatic steering command value $\theta_{adac}$ for automatic steering. In the embodiment, for example, the automatic steering control is a control for making the vehicle travel along a target trajectory. The automatic steering command value $\theta_{adac}$ is a target value of the steering angle for making the vehicle automatically travel along the target trajectory. The detailed description of a process for setting the automatic steering command value $\theta_{adac}$ is omitted herein.

The automatic steering command value $\theta_{adac}$ set by the superior ECU 201 is given to a motor control ECU 202 through an in-vehicle network. The torque sensor 11, the rotation angle sensor 23, the vehicle body acceleration sensor 25, the yaw rate sensor 26, and the like are connected to the motor control ECU 202, in addition to the superior ECU 201. The torque sensor 11 detects the torsion bar torque $T_{tb}$ applied to the torsion bar 10, based on the relative rotation displacement of the first shaft 8 and the second shaft 9. The rotation angle sensor 23 detects the rotation angle of the rotor of the electric motor 18 (hereinafter, referred to as "rotor rotation angle"). The vehicle body acceleration sensor 25 detects the vehicle body acceleration (vehicle acceleration) a. The yaw rate sensor 26 detects the vehicle body rotation angular velocity (vehicle rotation angular velocity) ω. The motor control ECU 202 controls the electric motor 18 based on the output signals of the sensors and the information given from the superior ECU 201.

Figure 13:
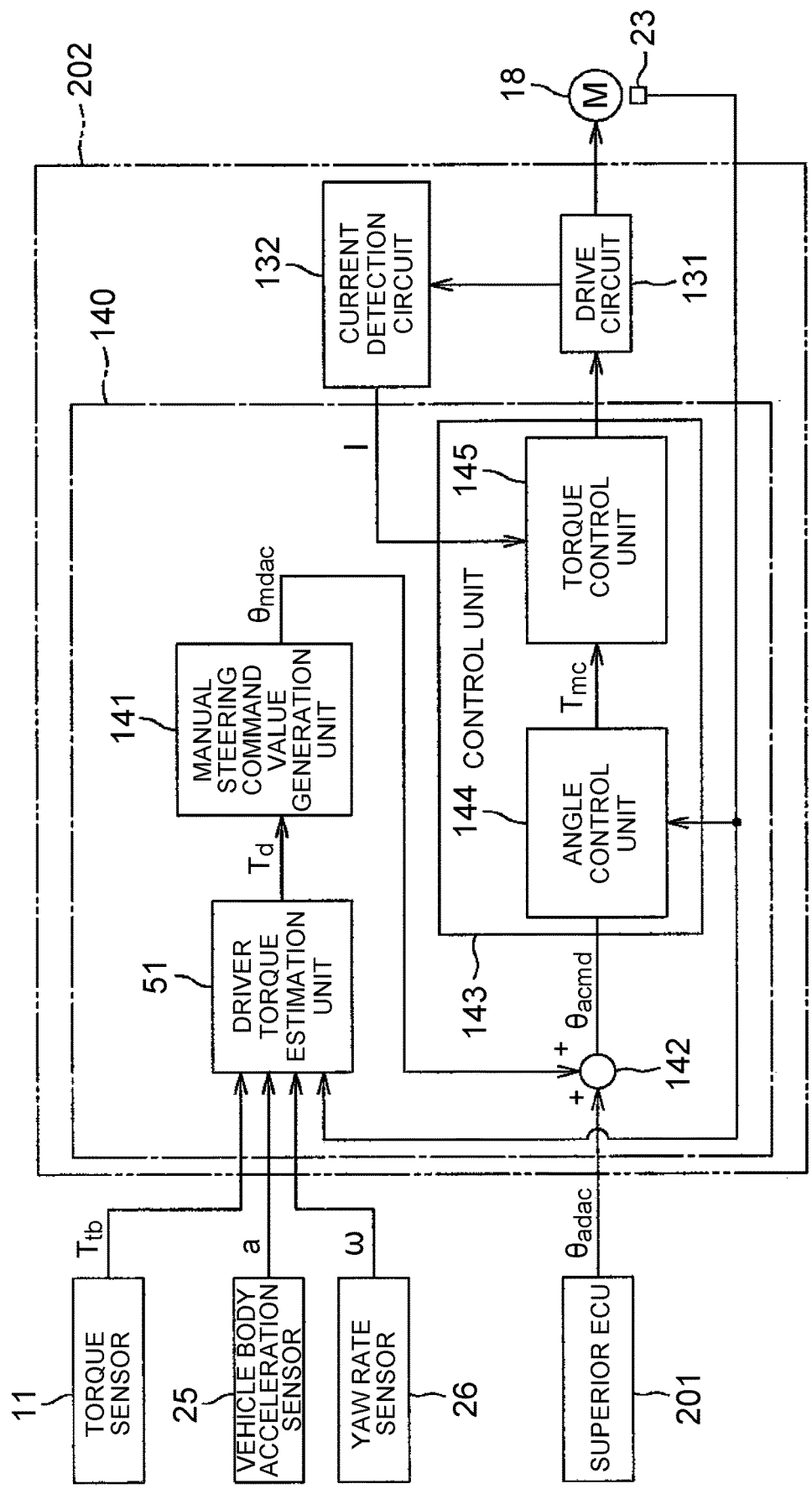
FIG. 13 is a block diagram for describing an electric configuration of a motor control ECU.

FIG. 13 is a block diagram for describing an electric configuration of the motor control ECU 202. The motor control ECU 202 includes a microcomputer 140, a drive circuit (inverter circuit) 131 that is controlled by the microcomputer 140 and that supplies electric power to the electric motor 18, and a current detection circuit 132 that detects electric current flowing through the electric motor 18 (hereinafter, referred to as a "motor current I").

The microcomputer 140 includes a CPU and memories (a ROM, a RAM, a nonvolatile memory, and the like), and functions as a plurality of function processing units by executing predetermined programs. The plurality of function processing units includes a driver torque estimation unit 51, a manual steering command value generation unit 141, a summed angle command value computation unit 142, and a control unit 143.

The driver torque estimation unit 51 estimates the driver torque $T_d$ based on the output signal of the rotation angle sensor 23, the torsion bar torque $T_{tb}$ detected by the torque sensor 11, the vehicle body acceleration a detected by the vehicle body acceleration sensor 25, and the vehicle body rotation angular velocity ω detected by the yaw rate sensor 26. The configuration of the driver torque estimation unit 51 is the same as the configuration of the driver torque estimation unit 51 in FIG. 3, and therefore, the detailed description is omitted.

The manual steering command value generation unit 141 is provided for setting, as the manual steering command value $\theta_{mdac}$, the steering angle depending on the steering wheel operation (more exactly, the rotation angle θ of the second shaft 9), when the driver operates the steering wheel 2. The manual steering command value generation unit 141 generates the manual steering command value $\theta_{mdac}$, using the driver torque $T_d$ estimated by the driver torque estimation unit 51. Details of the manual steering command value generation unit 141 will be described later.

The summed angle command value computation unit 142 computes a summed angle command value $\theta_{acmd}$, by adding the manual steering command value $\theta_{mdac}$ to the automatic steering command value $\theta_{adac}$ set by the superior ECU 201.

The control unit 143 angularly controls the electric motor 18 based on the summed angle command value $\theta_{acmd}$. More specifically, the control unit 143 drives and controls the drive circuit 131, such that the steering angle θ (the rotation angle θ of the second shaft 9) approaches the summed angle command value $\theta_{acmd}$.

The control unit 143 includes, for example, an angle control unit 144 and a torque control unit (current control unit) 145. The angle control unit 144 computes a motor torque command value $T_{mc}$ that is a target value of the motor torque of the electric motor 18, by performing proportional differentiation (PD) for the deviation between the summed angle command value $\theta_{acmd}$ and the actual steering angle θ computed based on the output signal of the rotation angle sensor 23.

Figure 14:
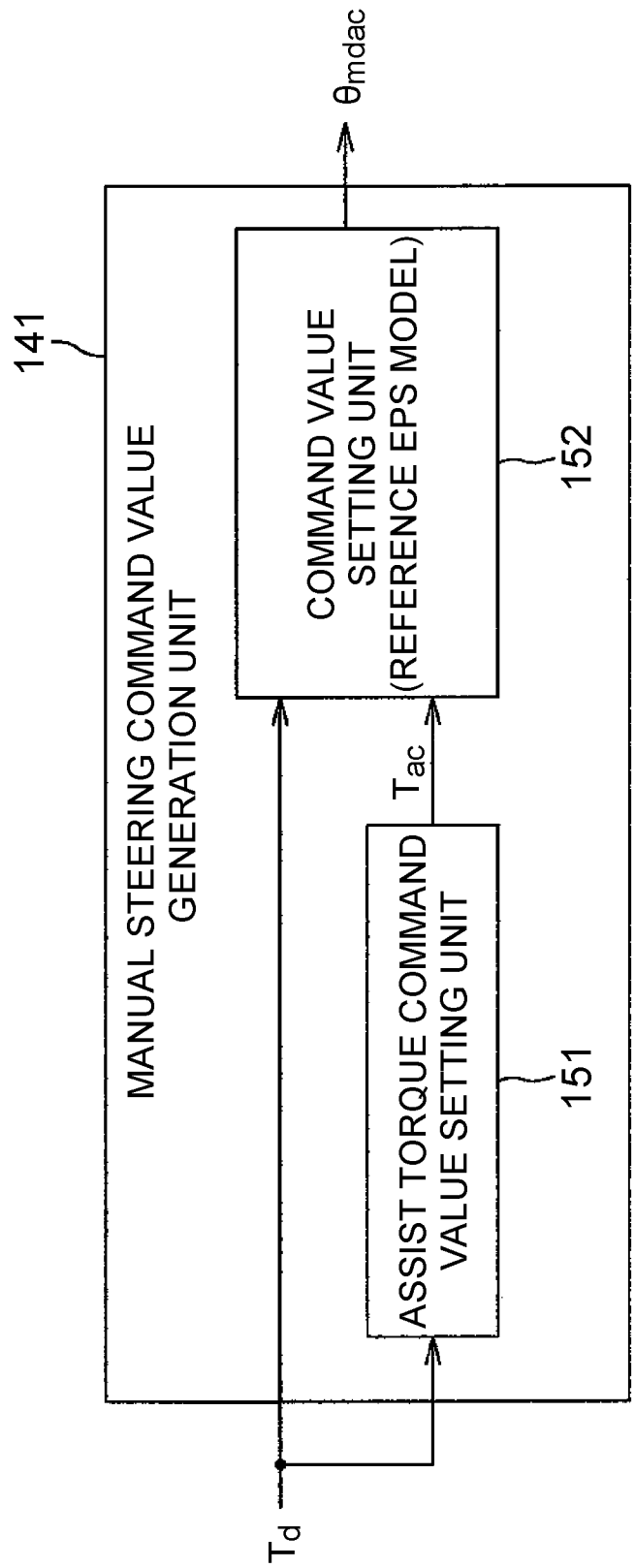
FIG. 14 is a block diagram showing a configuration of a manual steering command value generation unit in FIG. 13.

For example, first, the torque control unit 145 computes a current command value $I_{cmd}$, by dividing the motor torque command value $T_{mc}$ by a torque constant $K_t$ of the electric motor 18. Then, the torque control unit 145 drives the drive circuit 131 such that the motor current I detected by the current detection circuit 132 approaches the current command value $I_{cmd}$. FIG. 14 is a block diagram showing a configuration of the manual steering command value generation unit 141.

Figure 15:
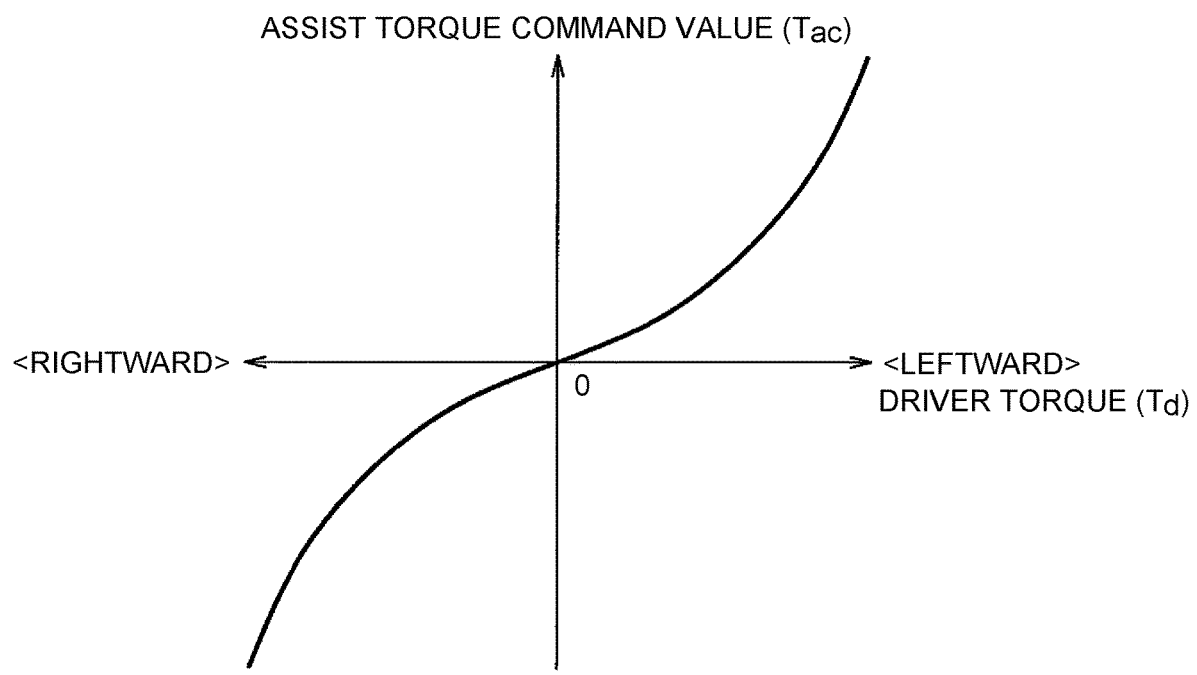
FIG. 15 is a graph showing an exemplary setting of an assist torque command value $T_{ac}$ for a driver torque $T_d$.

The manual steering command value generation unit 141 includes an assist torque command value setting unit 151 and a command value setting unit 152. The assist torque command value setting unit 151 sets an assist torque command value $T_{ac}$ that is a target value of the assist torque necessary for manual steering. The assist torque command value setting unit 151 sets the assist torque command value $T_{ac}$ based on the driver torque $T_d$ estimated by the driver torque estimation unit 51. FIG. 15 shows an exemplary setting of the assist torque command value $T_{ac}$ for the driver torque $T_d$. As for the driver torque $T_d$, for example, the torque for leftward steering has a positive value, and the torque for rightward steering has a negative value. Further, the assist torque command value $T_{ac}$ has a positive value when a steering assist force for leftward steering is generated from the electric motor 18, and has a negative value when a steering assist force for rightward steering is generated from the electric motor 18.

The assist torque command value $T_{ac}$ has a positive value when the driver torque $T_d$ has a positive value, and has a negative value when the driver torque $T_d$ has a negative value. Further, the assist torque command value $T_{ac}$ is set such that the absolute value of the assist torque command value $T_{ac}$ increases as the absolute value of the driver torque $T_d$ increases. The assist torque command value setting unit 151 may compute the assist torque command value $T_{ac}$, by multiplying the driver torque $T_d$ by a constant set in advance.

Figure 16:
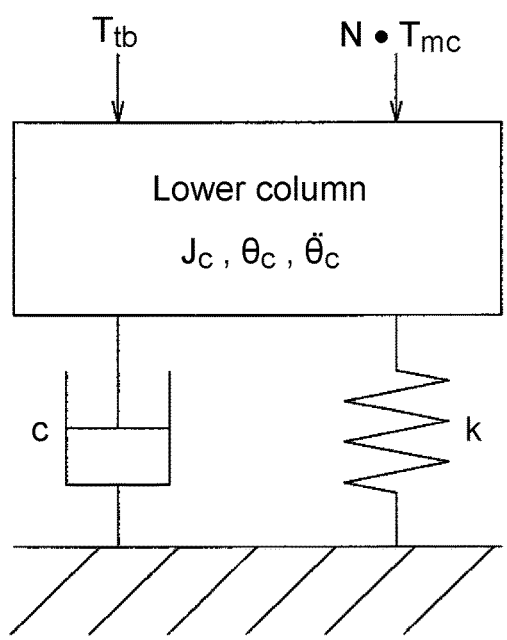
FIG. 16 is a schematic view showing an exemplary reference EPS model that is used in a command value setting unit.

In the embodiment, the command value setting unit 152 sets the manual steering command value $\theta_{mdac}$, using a reference EPS model. FIG. 16 is a schematic view showing an exemplary reference EPS model that is used in the command value setting unit 152. The reference EPS model is a single inertia model including a lower column. The lower column corresponds to the second shaft 9 and the worm wheel 21. In FIG. 16, $J_c$ is the inertia of the lower column, $\theta_c$ is the rotation angle of the lower column, and $T_{tb}$ is the torsion bar torque. The lower column receives the torsion bar torque $T_{tb}$, a torque $N \cdot T_{mc}$ that acts on the second shaft 9 from the electric motor 18, and a road surface load torque $T_{rl}$.

The road surface load torque $T_{rl}$ is expressed by the following Expression (12), using a spring constant k and a viscous damping coefficient c.

$$T_{rl} = -k \cdot \theta_c - c(d\theta_c/dt) \qquad (12)$$

In the embodiment, the spring constant k and the viscous damping coefficient c are set to predetermined values that are evaluated in advance by experiment, analysis, or the like. The motion equation of the reference EPS model is expressed by the following Expression (13).

$$J_c \cdot d^2\theta_c/dt^2 = T_{tb} + N \cdot T_{mc} - k \cdot \theta_c - c(d\theta_c/dt) \qquad (13)$$

The command value setting unit 152 sets the manual steering command value $\theta_{mdac}$, using Expression (13). On this occasion, the assist torque command value $T_{ac}$ set by the assist torque command value setting unit 151 (see FIG. 14) is used as $N \cdot T_{mc}$.

The column angle $\theta_c$ can be computed by solving the differential equation of Expression (13) while substituting the torsion bar torque $T_{tb}$ detected by the torque sensor 11 for $T_{tb}$ in Expression (13), and the obtained column angle $\theta_c$ can be set as the manual steering command value $\theta_{mdac}$. However, the torsion bar torque $T_{tb}$ detected by the torque sensor 11 includes disturbance other than the driver torque actually applied to the steering wheel 2 by the driver. Therefore, when the manual steering command value $\theta_{mdac}$ is computed by substituting the torsion bar torque $T_{tb}$ for $T_{tb}$ in Expression (13), there is a concern that the manual steering command value $\theta_{mdac}$ is set based on the disturbance other than the driver torque even when the driver is not operating the steering wheel 2.

Hence, in the embodiment, the command value setting unit 152 computes the column angle $\theta_c$ by solving the differential equation of Expression (13) while substituting the driver torque $T_d$ estimated by the driver torque estimation unit 51 for $T_{tb}$ in Expression (13). Then, the command value setting unit 152 sets the obtained column angle $\theta_c$ as the manual steering command value $\theta_{mdac}$. Thereby, it is possible to restrain the manual steering command value $\theta_{mdac}$ from being set based on the disturbance other than the driver torque when the driver is not operating the steering wheel 2.

In the electric power steering apparatus 1A in FIG. 12, the manual steering command value is added to the automatic steering command value, the summed angle command value is computed, and the electric motor 18 is controlled based on the summed angle command value. Thereby, it is possible to realize a cooperative control that allows the manual steering while performing mainly the automatic steering control as the steering control, without the switching between the manual steering control and the automatic steering control. Accordingly, it is possible to seamlessly perform the transition between the manual steering control and the automatic steering control, and therefore, it is possible to reduce an uncomfortable feeling of the driver.

Figure 17:
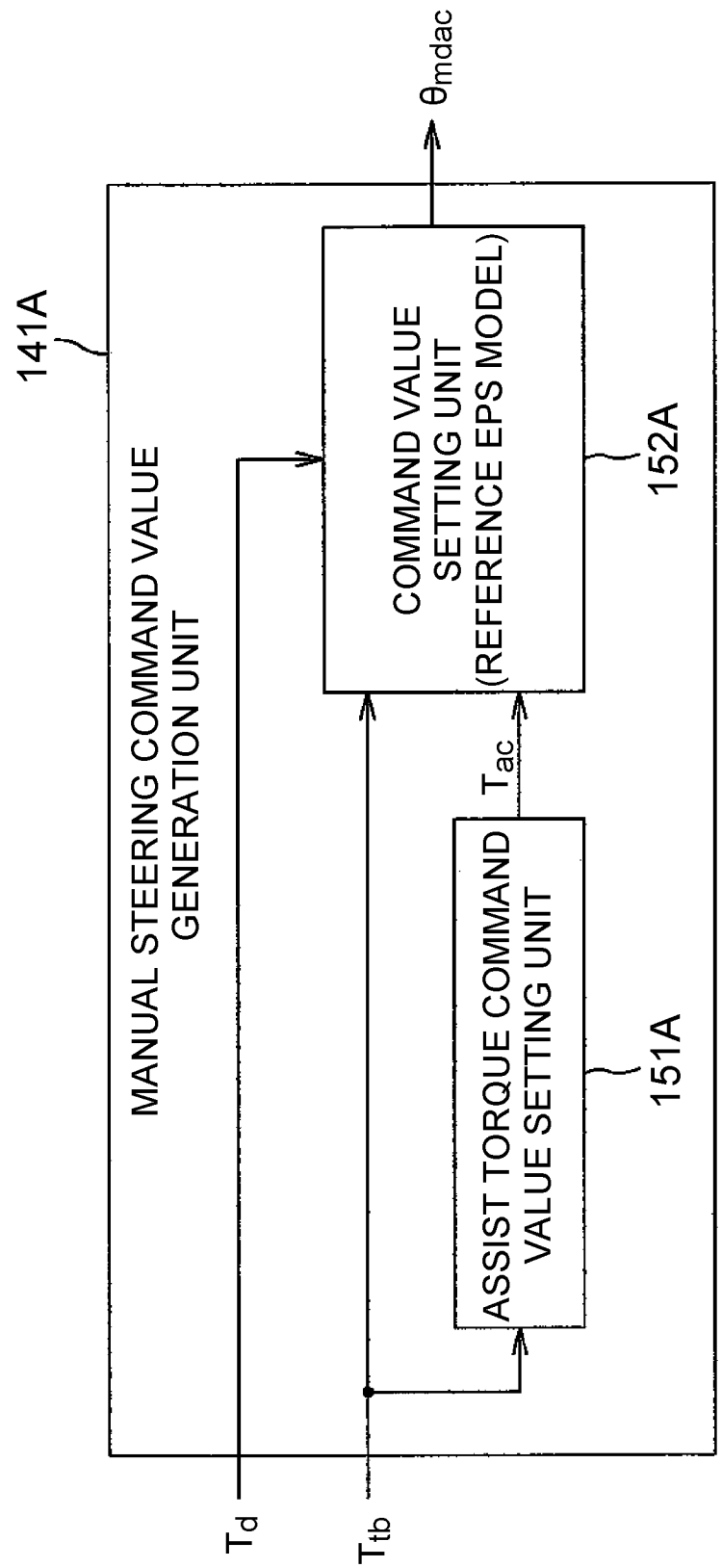
FIG. 17 is a block diagram showing a modification of the manual steering command value generation unit.

In the electric power steering apparatus 1A in FIG. 12, as described above, it is possible to restrain the manual steering command value $\theta_{mdac}$ from being set based on the disturbance other than the driver torque when the driver is not operating the steering wheel 2. FIG. 17 is a block diagram showing a modification of the manual steering command value generation unit in FIG. 14. In FIG. 17, parts corresponding to the above-described parts in FIG. 14 are denoted by the same reference characters as those in FIG. 14.

A manual steering command value generation unit 141A includes an assist torque command value setting unit 151A and a command value setting unit 152A. The command value setting unit 152A receives the torsion bar torque $T_{tb}$ detected by the torque sensor 11 and the assist torque command value $T_{ac}$ set by the assist torque command value setting unit 151A. The assist torque command value setting unit 151A sets the assist torque command value $T_{ac}$ based on the torsion bar torque $T_{tb}$ detected by the torque sensor 11. As an exemplary setting of the assist torque command value $T_{ac}$ for the torsion bar torque $T_{tb}$, the abscissa axis in FIG. 15 may be changed from the driver torque $T_d$ to the torsion bar torque $T_{tb}$. Further, the command value setting unit 152A receives the driver torque $T_d$ estimated by the driver torque estimation unit 51.

When the absolute value $|T_d|$ of the driver torque $T_d$ is equal to or larger than a predetermined threshold $\psi$ ($\psi>0$), the command value setting unit 152A sets the manual steering command value $\theta_{mdac}$ ($=\theta_c$) by solving the differential equation of Expression (13) while substituting the torsion bar torque $T_{tb}$ and assist torque command value $T_{ac}$ input to the command value setting unit 152A for $T_{tb}$ and $N \cdot T_{mc}$ in Expression (13) respectively. On the other hand, when the absolute value $|T_d|$ of the driver torque $T_d$ is smaller than the threshold $\psi$, the command value setting unit 152A sets the manual steering command value $\theta_{mdac}$ ($=\theta_c$) by solving the differential equation of Expression (13) while substituting zero for $T_{tb}$ and $N \cdot T_{mc}$ in Expression (13).

In the manual steering command value generation unit 141A, the manual steering command value $\theta_{mdac}$ is set using the torsion bar torque $T_{tb}$. When the absolute value $|T_d|$ of the driver torque $T_d$ is smaller than the threshold w, the torsion bar torque $T_{tb}$ to be input to the manual steering command value generation unit 141A is set substantially to zero. Thereby, it is possible to restrain the manual steering command value $\theta_{mdac}$ from being set based on the disturbance other than the driver torque when the driver is not operating the steering wheel 2. Further, since the manual steering command value $\theta_{mdac}$ is set using the torsion bar torque $T_{tb}$, it is possible to reduce the time lag of the manual steering command value $\theta_{mdac}$ from the steering wheel operation by the driver, compared to the case of using the driver torque $T_d$ estimated by the driver torque estimation unit 51.

Figure 18:
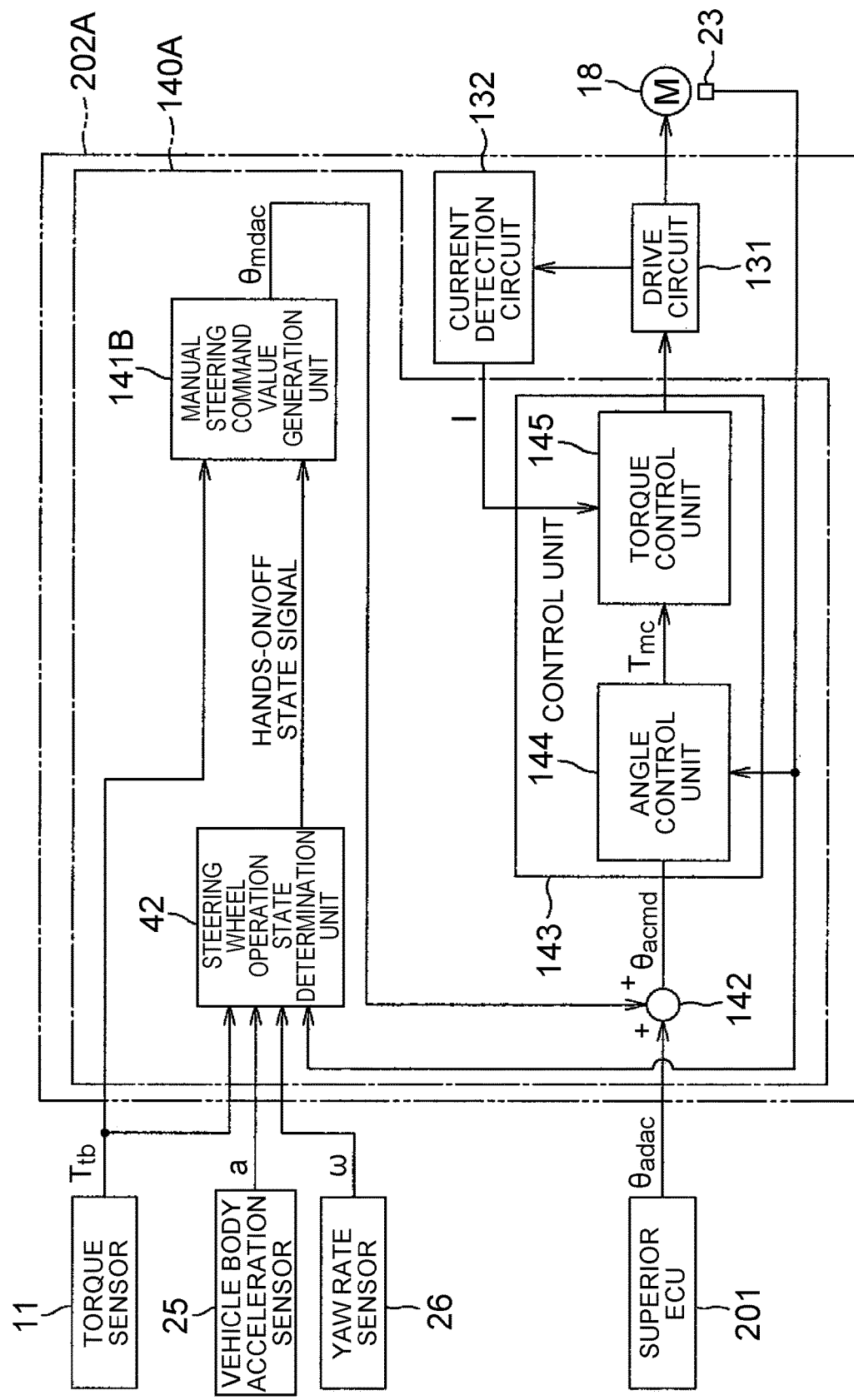
FIG. 18 is a block diagram showing a modification of the motor control ECU.

FIG. 18 is a block diagram showing a modification of the motor control ECU in FIG. 13. In FIG. 18, parts corresponding to the above-described parts in FIG. 13 are denoted by the same reference characters as those in FIG. 13. A motor control ECU 202A is different from the motor control ECU 202 in FIG. 13, in the configuration of function processing units that are realized by a CPU in a microcomputer 140A. The microcomputer 140A includes a steering wheel operation state determination unit 42, a manual steering command value generation unit 141B, a summed angle command value computation unit 142, and a control unit 143, as the function processing units.

The steering wheel operation state determination unit 42 determines whether the steering wheel operation state is the hands-on state where the driver is holding the steering wheel or the hands-off state where the driver is not holding the steering wheel, based on the output signal of the rotation angle sensor 23, the torsion bar torque $T_{tb}$, the vehicle body acceleration a, and the vehicle body rotation angular velocity ω. The configuration of the steering wheel operation state determination unit 42 is the same as the configuration of the steering wheel operation state determination unit 42 in FIG. 2 and FIG. 3, and therefore, the detailed description is omitted. The steering wheel operation state determination unit 42 outputs a hands-on state signal when determining that the steering wheel operation state is the hands-on state, and outputs a hands-off state signal when determining that the steering wheel operation state is the hands-off state.

The manual steering command value generation unit 141B generates the manual steering command value $\theta_{mdac}$, using the output signal (hands-on/off state signal) of the steering wheel operation state determination unit 42 and the torsion bar torque $T_{tb}$ detected by the torque sensor 11. Details of the manual steering command value generation unit 141B will be described later. The summed angle command value computation unit 142 computes the summed angle command value $\theta_{acmd}$ by adding the manual steering command value $\theta_{mdac}$ to the automatic steering command value $\theta_{adac}$ set by the superior ECU 201.

Figure 19:
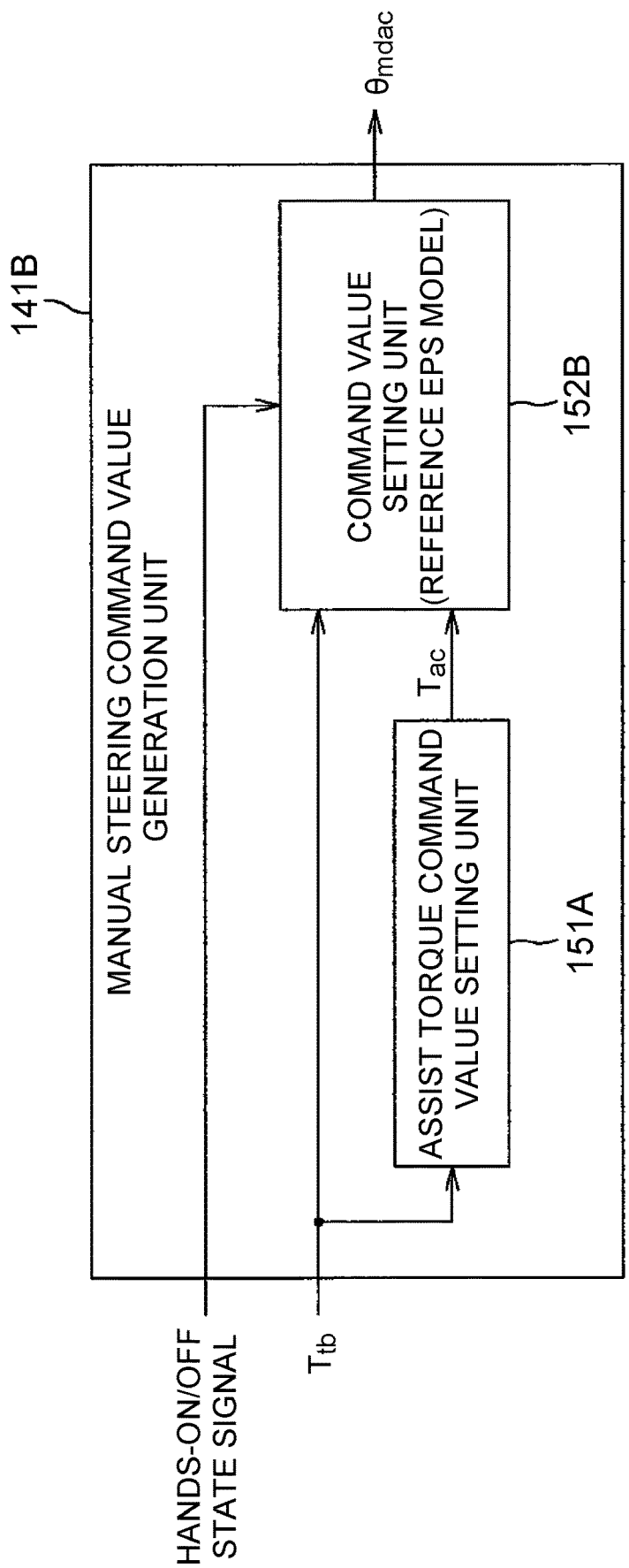
FIG. 19 is a block diagram showing a configuration of the manual steering command value generation unit in FIG. 18.

The control unit 143 angularly controls the electric motor 18 based on the summed angle command value $\theta_{acmd}$. The configuration of the control unit 143 is the same as the configuration of the control unit 143 in FIG. 13, and therefore, the detailed description is omitted. FIG. 19 is a block diagram showing a configuration of the manual steering command value generation unit 141B. The manual steering command value generation unit 141B includes an assist torque command value setting unit 151A and a command value setting unit 152B.

The assist torque command value setting unit 151A sets the assist torque command value $T_{ac}$ that is a target value of the assist torque necessary for manual steering. The operation of the assist torque command value setting unit 151A is the same as the operation of the assist torque command value setting unit 151A in FIG. 17, and therefore, the detailed description is omitted. The command value setting unit 152B receives the torsion bar torque $T_{tb}$ detected by the torque sensor 11 and the assist torque command value $T_{ac}$ set by the assist torque command value setting unit 151A. Further, the command value setting unit 152B receives the output signal (hands-on/off state signal) of the steering wheel operation state determination unit 42.

When the output signal of the steering wheel operation state determination unit 42 is the hands-on state signal, the command value setting unit 152B sets the manual steering command value $\theta_{mdac}$ (=$\theta_c$) by solving the differential equation of Expression (13) while substituting the torsion bar torque $T_{tb}$ and assist torque command value $T_{ac}$ input to the command value setting unit 154B for $T_{tb}$ and $N \cdot T_{mc}$ in Expression (13) respectively. On the other hand, when the output signal of the steering wheel operation state determination unit 42 is the hands-off state signal, the command value setting unit 152B sets the manual steering command value $\theta_{mdac}$ (=$\theta_c$) by solving the differential equation of Expression (13) while substituting zero for $T_{tb}$ and $N \cdot T_{mc}$ in Expression (13).

In the manual steering command value generation unit 141B, the manual steering command value $\theta_{mdac}$ is set using the torsion bar torque $T_{tb}$. When the output signal of the steering wheel operation state determination unit 42 is the hands-off state signal, the torsion bar torque $T_{tb}$ input to the manual steering command value generation unit 141B is set substantially to zero. Thereby, it is possible to restrain the manual steering command value $\theta_{mdac}$ from being set based on the disturbance other than the driver torque when the driver is not operating the steering wheel 2. Further, since the manual steering command value $\theta_{mdac}$ is set using the torsion bar torque $T_{tb}$, it is possible to reduce the time lag of the manual steering command value $\theta_{mdac}$ from the steering wheel operation by the driver, compared to the case of using the driver torque $T_d$ estimated by the driver torque estimation unit 51.

The second embodiment of the disclosure has been described above. The disclosure can be carried out as other embodiments. For example, in the second embodiment, the command value setting units 152, 152A, 152B (see FIG. 14, FIG. 17 and FIG. 19) set the manual steering command value $\theta_{mdac}$ based on the reference EPS model, but the command value setting units 152, 152A, 152B may set the manual steering command value θmdac by another method.

For example, the command value setting units 152, 152A, 152B may set the manual steering command value $\theta_{mdac}$, using a map that includes the relation between the driver torque $T_d$ (in the case of FIG. 14) or the torsion bar torque $T_{tb}$ (in the case of FIG. 17 or FIG. 19) and the manual steering command value $\theta_{mdac}$. In the first and second embodiment, an example in which the disclosure is applied to the column type EPS has been described. However, the disclosure can be applied to an EPS other than the column type EPS. Further, the disclosure can be applied also to a steer-by-wire system.

In addition, in the disclosure, various design modifications can be made in the scope of the claims.

What is claimed is:

1. A steering apparatus comprising:
a first shaft which is coupled to a steering wheel, the steering wheel being a steering wheel by which a vehicle is steered;
a torsion bar;
a second shaft which is coupled to the first shaft through the torsion bar;
a torsion bar torque detection unit, the torsion bar torque detection unit detecting a torsion bar torque which is applied to the torsion bar; and
an electronic control unit configured to estimate a driver torque which is applied to the steering wheel by a driver, wherein the electronic control unit is configured to:
i) compute a steering wheel rotation angle which is a rotation angle of the steering wheel;
ii) compute a value including an added value, as the driver torque, the added value being a value resulting from adding the torsion bar torque, a steering wheel inertia torque compensation value, and a gravity torque compensation value, the steering wheel inertia torque compensation value being a product of a second-order differential value of the steering wheel rotation angle and an inertia moment of the steering wheel, the gravity torque compensation value being a compensation value for a gravity torque to be applied to the first shaft by gravity that acts on a gravity center of the steering wheel, wherein:
the electronic control unit is configured to compute the driver torque by adding a coulomb friction torque compensation value to the added value, the coulomb friction torque compensation value being a compensation value for a coulomb friction torque that acts on the first shaft and the steering wheel, and
the coulomb friction torque compensation value is a product of a hyperbolic tangent and a predetermined coulomb friction torque coefficient, the hyperbolic tangent being a hyperbolic tangent of a product of a predetermined coulomb friction torque gradient and a first-order differential value of the steering wheel rotation angle.

2. The steering apparatus according to claim 1, further comprising a rotational angle detection unit which directly or indirectly detects a rotation angle of the second shaft, wherein the electronic control unit is configured to compute the steering wheel rotation angle using the rotation angle of the second shaft and the torsion bar torque.

3. The steering apparatus according to claim 1, wherein:
the electronic control unit is configured to compute the driver torque by adding a viscous friction torque compensation value to the added value, the viscous friction torque compensation value being a compensation value for a viscous friction torque that acts on the first shaft and the steering wheel; and the viscous friction torque compensation value is a product of a first-order differential value of the steering wheel rotation angle and a predetermined viscous friction torque coefficient.

4. The steering apparatus according to claim 1, wherein:
the gravity torque compensation value is a product of a distance between a gravity center position of the steering wheel and a rotation center position, a mass of the steering wheel, a sine value of the steering wheel rotation angle, and a cosine value of a steering wheel tilt angle;

the steering wheel tilt angle is an angle between a vertical line and a rotation plane of the steering wheel in a state where the steering wheel is mounted on the vehicle, the vertical line being a vertical line that passes through the rotation center position of the steering wheel; and the steering wheel rotation angle is an angle corresponding to a rotation amount from a neutral position and a rotation direction, the neutral position being a steering wheel position at which an orientation of the vehicle is a straight direction.

5. The steering apparatus according to claim 1, wherein the electronic control unit is configured to:
  i) compute an acceleration in a vehicle-lateral direction that acts on the gravity center of the steering wheel; and
  ii) compute the driver torque by adding a lateral acceleration torque compensation value to the added value, the lateral acceleration torque compensation value being a compensation value for a lateral acceleration torque which is applied to the first shaft by the acceleration in the vehicle-lateral direction that acts on the gravity center of the steering wheel.

6. The steering apparatus according to claim 5, wherein the lateral acceleration torque compensation value is a product of a distance between a gravity center position of the steering wheel and a rotation center position, a mass of the steering wheel, the acceleration in the vehicle-lateral direction that acts on the gravity center of the steering wheel, and a cosine value of the steering wheel rotation angle.

7. The steering apparatus according to claim 1, wherein:
the electronic control unit is configured to determine whether a hands-on state is formed, based on the driver torque; and the hands-on state is a state where the driver is holding the steering wheel.

8. The steering apparatus according to claim 7, further comprising an electric motor configured to assist steering, wherein the electronic control unit is configured to:
  i) generate a manual steering command value using the torsion bar torque, only when it is determined that the hands-on state is formed;
  ii) compute a summed angle command value by adding the manual steering command value to an automatic steering command value; and
  iii) control the electric motor based on the summed angle command value.

9. The steering apparatus according to claim 8, wherein the electronic control unit is configured to:
  i) set an assist torque command value based on the torsion bar torque; and
  ii) generate the manual steering command value using the torsion bar torque and the assist torque command value, only when it is determined that the hands-on state is formed.

10. The steering apparatus according to claim 1, further comprising an electric motor configured to assist steering, wherein the electronic control unit is configured to:
  i) generate a manual steering command value using the driver torque;
  ii) compute a summed angle command value by adding the manual steering command value to an automatic steering command value; and
  iii) control the electric motor based on the summed angle command value.

11. The steering apparatus according to claim 10, wherein the electronic control unit is configured to:
  i) set an assist torque command value based on the driver torque; and
  ii) generate the manual steering command value using the driver torque and the assist torque command value.

12. The steering apparatus according to claim 1, further comprising an electric motor configured to assist steering, wherein the electronic control unit is configured to:
  i) generate a manual steering command value using the torsion bar torque, only when an absolute value of the driver torque is equal to or larger than a predetermined value;
  ii) compute a summed angle command value by adding the manual steering command value to an automatic steering command value; and
  iii) control the electric motor based on the summed angle command value.

13. The steering apparatus according to claim 12, wherein the electronic control unit is configured to:
  i) set an assist torque command value based on the torsion bar torque; and
  ii) generate the manual steering command value using the torsion bar torque and the assist torque command value, only when the absolute value of the driver torque is equal to or larger than the predetermined value.

* * * * *